US008655636B2

(12) United States Patent  (10) Patent No.: US 8,655,636 B2
Kumar et al.  (45) Date of Patent: Feb. 18, 2014

(54) SEMANTIC TRANSLATION OF TIME-DRIVEN SIMULINK DIAGRAMS USING INPUT/OUTPUT EXTENDED FINITE AUTOMATA

(75) Inventors: Ratnesh Kumar, Ames, IA (US); Changyan Zhou, East Windsor, CT (US)

(73) Assignee: Iowa State University Research Foundation, Inc., Ames, IA (US)

( * ) Notice: Subject to any disclaimer, the term of this patent is extended or adjusted under 35 U.S.C. 154(b) by 260 days.

(21) Appl. No.: 13/165,907

(22) Filed: Jun. 22, 2011

(65) Prior Publication Data

US 2011/0320178 A1  Dec. 29, 2011

Related U.S. Application Data

(60) Provisional application No. 61/357,568, filed on Jun. 23, 2010.

(51) Int. Cl.
*G06F 9/445*  (2006.01)

(52) U.S. Cl.
USPC ............... 703/22; 703/2; 703/13; 717/106; 717/108; 717/114

(58) Field of Classification Search
USPC ............ 703/2, 5, 13, 22; 717/114, 106, 108
See application file for complete search history.

(56) References Cited

U.S. PATENT DOCUMENTS

| | | | |
|---|---|---|---|
| 7,093,231 B2* | 8/2006 | Nuss | 717/114 |
| 7,496,892 B2* | 2/2009 | Nuss | 717/114 |
| 7,698,668 B2* | 4/2010 | Balasubramanian et al. | 716/106 |
| 8,260,597 B1* | 9/2012 | Raghavan et al. | 703/13 |
| 2008/0086705 A1* | 4/2008 | Balasubramanian et al. | 716/5 |

OTHER PUBLICATIONS

Agrawal, Aditya et al., "Semantic Translation of Simulink/Stateflow Models to Hybrid Automata Using Graph Transformations", Electronic notes in Theoretical Computer Science, 109 (2004) 43-56.
Alur, Rajeev et al., "Symbolic Analysis for Improving Simulation Coverage of Simulink/Stateflow Models", EMSOFT'08, Oct. 19-24, 2008, Atlanta, GA, ACM 978-1-60558-468-03/08/10, 10 pages.
Caspi, Paul et al., "From Simulink to SCADEL/Lustre to TTA: a Layered Approach for Distributed Embedded Applications*", LCTES'03, Jun. 11-13, 2003, San Diego, CA, ACM 1-58113-647-1/03/0006, pp. 89-99.
Jersak, Marek et al., "Embedded System Design using the SPI Workbench", Design Languages 2000, pp. 153-163.
Tripakis, Stavros et al., "Translating Discrete-Time Simulink to Lustre", ACM Transactions on Embedded Computing Systems, vol. 4, No. 4, Nov. 2005, pp. 779-818.

\* cited by examiner

*Primary Examiner* — Thai Phan
(74) *Attorney, Agent, or Firm* — McKee, Voorhees & Sease, P.L.C.

(57) ABSTRACT

A method of semantic translation of a class of diagrams to input/output-extended finite automata is provided. The method includes receiving a data representation of a diagram, said diagram comprising a plurality of blocks and said diagram being associated with a graphical modeling environment which defines semantics for executing the diagram, and processing, using a computing device, the data representation of the diagram to translate the diagram to an input/output-extended finite automata model.

18 Claims, 10 Drawing Sheets

SEMANTIC TRANSLATION OF TIME-DRIVEN SIMULINK DIAGRAMS USING INPUT/OUTPUT EXTENDED FINITE AUTOMATA

CROSS-REFERENCE TO RELATED APPLICATIONS

This application claims priority under 35 U.S.C. §119 of a provisional application Ser. No. 61/357,568 filed Jun. 23, 2010, and which application is hereby incorporated by reference in its entirety.

GRANT REFERENCE

This invention was made with government support under Grant No. NSF-CCF-0811541 awarded by the National Science Foundation. The government has certain rights in the invention.

FIELD OF THE INVENTION

The present invention relates to a semantic translation approach for diagrams associated with graphical modeling and simulation environments or tools. The semantic translation generates a model which may be used for further analysis such as test generation and formal verification.

BACKGROUND OF THE INVENTION

Graphical modeling and simulation environments or tools allow users to construct and analyze models of processes or systems using diagrams. There are various examples of such tools commercially available. One such example is Simulink from The MathWorks, Inc. A further example of a graphical modeling and simulation environments is Lab VIEW, available from National Instruments Corporation.

Typically, these diagrams describe computations or logic which can ultimately be implemented using application specific devices, computers, microcontrollers, FPGA, integrated circuits, or computing devices. The diagrams are built using elements or blocks which are interconnected. The diagrams are created within a graphical modeling environment which defines the semantics for executing the diagrams. Software systems or descriptions of hardware systems may then be produced which exhibit the behavior of the model or portions thereof.

The Simulink diagrams can be simulated to generate sample-runs (runs on sample times) which provide a means for their validation. Other means of validation include testing and verification. In order to be able to test a Simulink diagram or verify an implementation of a Simulink diagram, it is desirable to translate such diagrams into a form amenable to automated test generation or verification. Thus the corresponding techniques and tools for such translation are needed.

BRIEF SUMMARY OF THE INVENTION

Therefore, it is a primary object, feature, or advantage of the present invention to improve over the state of the art.

It is a further object, feature, or advantage of the present invention to a semantic translation approach which is recursive.

It is a still further object, feature, or advantage of the present invention to provide a semantic translation approach which is amenable to automated test generation and verification.

It is a still further object, feature, or advantage of the present invention to provide a semantic translation approach which has no special restriction on the types of blocks.

It is a still further object, feature, or advantage of the present invention to provide a semantic translation approach which is sound and complete.

According to one aspect of the present invention, a method of semantic translation of a diagram associated with a graphical modeling environment into an input/output-extended finite automata (I/O-EFA) model is provided. The method includes receiving a representation of the diagram and processing the representation of the diagram with a computing device by (a) representing all atomic blocks in said diagram as a tuple, (b) representing the diagram using a connecting rule and a conditioning rule, (c) determining an order in which the blocks included inside the diagram are executed, (d) translating the atomic blocks into the I/O-EFA model using a first algorithm, and (e) translating for the connecting rule and the condition rule using a second algorithm and a third algorithm, respectively to thereby modify the I/O-EFA model.

According to another aspect of the present invention, a computer-readable storage medium storing computer-executable instructions that are executed on a processing device is provided. The computer-executable instructions include instructions for receiving a data representation of a diagram, said diagram comprising a plurality of blocks and said diagram being associated with a graphical modeling environment which defines semantics for executing the diagram, and instructions for processing the data representation of the diagram to translate the diagram into an input/output-extended finite automata model.

According to another aspect of the present invention, a method of semantic translation of a diagram into input/output-extended finite automata (I/O-EFA) model is provided. The method includes: representing atomic blocks in the diagram as a tuple; representing the diagram using a connecting-rule and a conditioning-rule; determining an order in which the atomic blocks of the diagram are executed; translating the atomic-blocks into an I/O-EFA model; and translating for the connecting-rule and the conditioning-rule to adjust the I/O-EFA model. The steps may be performed by a computing device.

According to another aspect of the present invention, a method of translating a class of diagrams as input/output-extended finite automata is provided. The method includes receiving a data representation of a diagram, said diagram including a plurality of blocks and said diagram being associated with a graphical modeling environment which defines semantics for executing the diagram. The method further includes processing, using a computing device, the data representation of the diagram to translate the diagram into an input/output-extended finite automata model.

DETAILED DESCRIPTION OF THE PREFERRED EMBODIMENTS

1. Introduction

Figure 1:
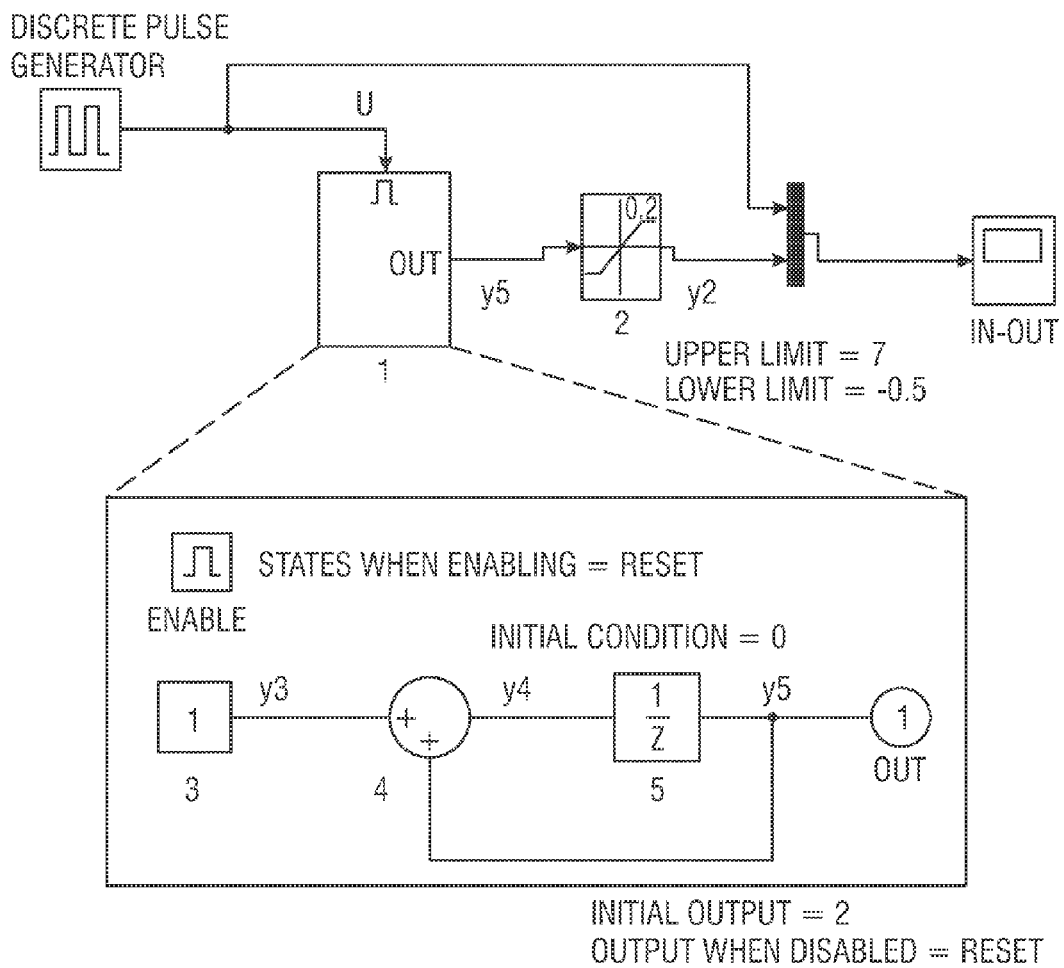
FIG. 1 is a simulink diagram of a counter.

Although the present invention may be used with diagrams from any number of graphical environments, Simulink/Stateflow (S/S) diagrams are used as representative examples of such diagrams. Simulink/Stateflow (S/S) [2] diagrams are graphical representations of dynamical systems, and can capture both time-driven as well as event-driven dynamics of hybrid systems. Stateflow diagrams are used for representing and simulating event-driven dynamics. The S/S diagrams can be simulated to generate sample-runs (runs on sample times) which provide a means for their validation. Other means of validation include testing and verification. In order to be able to test a S/S diagram or verify an implementation of a S/S diagram, a model-based approach is desirable, where a model can be used for automated test generation or as a formal specification.

Simulink blocks can be time-driven or non time-driven. A time-driven block, such as an Integrator block, represents the time-dependent mathematical relationships between its inputs and outputs. On the other hand, non time-driven block, such as a Stateflow block or a Discrete Event Subsystem block, may evolve upon the occurrence of events. Here, we focus on study the semantic translation of time-driven blocks, and for conciseness, we write "Simulink blocks" to mean only the "time-driven Simulink blocks".

We propose an approach for translating the behaviors of a Simulink diagram at (discrete) sample times to input/output-extended finite automata (I/O-EFA) [9, 15]. Note that a Simulink diagram can represent a hybrid system that combines event-driven discrete and time-dependent continuous behaviors, whereas I/O-EFA is a model of a reactive untimed infinite state system. Yet, since we are only interested in capturing the behaviors of a Simulink diagram at sample times, an I/O-EFA model (which is untimed) suffices.

Simulink provides a library of blocks (such as transfer functions, discontinuities, math operations, logic and bit operations etc.), which can be interconnected in a hierarchical fashion to form an overall Simulink diagram. We consider the blocks in the Simulink library to be "atomic", and formally define an atomic-block. Further we formulate two rules, namely connecting-rule and conditioning-rule, used in Simulink for building complex blocks by combining the simpler ones, and formally define a class of Simulink diagrams formed using these rules. This recursive view of defining the class of all Simulink diagrams leads to a recursive translation in form of I/O-EFA.

In order to obtain an I/O-EFA model recursively, we first present an algorithm for translating an atomic-block to an I/O-EFA. Next for each rule of combining simpler Simulink diagrams to construct a complex Simulink diagram, we develop a corresponding rule for combining the I/O-EFA models of simpler Simulink diagrams to build the I/O-EFA model of the more complex Simulink diagram.

We introduce the concept of a step of an I/O-EFA to emulate the computation of a Simulink diagram at a sample time. A sequence of steps, namely, a step-trajectory, generates outputs over a sequence of sample times. We show that the translation approach is sound and complete: The input-state-output behavior of the I/O-EFA, defined in terms of a step-trajectory, preserves the input-state-output behavior of the corresponding Simulink diagram at each sample time (assuming the same integration method for any of the continuous blocks with dynamics).

Various aspects of the present invention include:

The translation approach is recursive. Formal definitions of an atomic Simulink block and a class of Simulink diagrams formed using the identified connecting-rule and conditioning-rule are provided. These definitions can be used to create a more complex Simulink diagram from the simpler ones.

The model of I/O-EFA is amenable to automated test generation [10] or verification [14]. The model can be directly supplied to a test generation or verification tool that accepts I/O-EFA models or programming languages such as C/C++ or Java since an I/O-EFA model can be easily translated into these languages.

The translation approach has no special restriction on the types of Simulink blocks. The approach supports virtually all blocks in Simulink Library (in this patent we only consider time-driven blocks) provided that the block can be mathematically written as input-state-output functions over time. Also unlike [4], it does not require a clear separation between discrete and continuous dynamics for modeling hybrid systems. As an illustration, consider for example the bouncing ball example presented herein.

The translation approach is sound and complete: The input-state-output behavior of an I/O-EFA model, as defined in terms of a step-trajectory, preserves the input-state-output behavior of the corresponding Simulink diagram at each sample time (assuming the same integration method for any of the continuous blocks with dynamics).

The translation approach can handle the Simulink features such as multi-rate diagrams, sample times with initial offsets, variable-step simulation etc.

The translation approach is general in that it can be applied to other graphical modeling and simulation tools such as LabView.

2. I/O-EFA

We present the notion of an input-output extended finite automaton (I/O-EFA) as a formal model of representation for a Simulink diagram. I/O-EFA is a model of a reactive untimed infinite state system in form of an automaton, extended with discrete variables such as inputs, outputs, and data. Using I/O-EFA as a model, many value-passing processes can be represented as finite graphs. An I/O-EFA consists of locations (i.e., symbolic-state), data (i.e., numeric-state), numeric-inputs, numeric-outputs, symbolic-inputs, symbolic-outputs, transitions, an initial location, initial data values, and a final location. The locations (symbolic-states) together with the data (numeric-states) form the state-space of a I/O-EFA. The locations are finite and form the vertices of the automaton graph. The edges of the graph represent transitions between the locations and are guarded by constraints over the data and the inputs. The occurrence of a transition triggers a data update and an output assignment.

Definition 1 An input/output extended finite automaton (I/O-EFA) is a tuple $$P=(L,D,U,Y,\Sigma,\Delta,l_0,D_0,l_m,E)$$

where
 L is the set of locations (symbolic-states),
 $D=D_1\times\ldots\times D_n$ is the set of typed data (numeric-states),
 $U=U_1\times\ldots\times U_m$ is the set of typed numeric-inputs,
 $Y=Y_1\times\ldots\times Y_p$ is the set of typed numeric-outputs,
 $\Sigma$ is the set of symbolic-inputs, Δ is the set of symbolic-outputs,
$l_0 \in L$ is the initial location,
$D_0 \subset D$ is the set of initial-data values,
$l_m \in \overline{L}$ is the final location, and
E is the set of edges, and each $e \in E$ is a 7-tuple,
$e=(o_e, t_e, \sigma_e, \delta_e, G_e, f_e, h_e)$, where
  $o_e \in L$ is the origin location,
  $t_e \in L$ is the terminal location,
  $\sigma_e \in \Sigma \cup \{\epsilon\}$ is the symbolic-input,
  $\delta_e \in \Delta \cup \{\epsilon\}$ is the symbolic-output,
  $G_e \subset D \times U$ is the enabling guard (a predicate),
  $f_e: D \times U \to D$ is the data-update function,
  $h_e: D \times U \to Y$ is the output-assignment function.

Initially, P starts from the initial location $l_0$ and an initial data value $d_0 \in D_0$. While at a certain state $(l,d) \in L \times D$, a transition $e \in E$ such that $o_e = l$ is enabled if the input $\sigma_e$ arrives, and the data d and input u are such that the guard $G_e(d,u)$ holds. Note when $\sigma_e = \epsilon$, the transition is enabled when only the guard $G_e(d,u)$ holds; on the other hand when $G_e(D,U)=\text{True}$, then the transition is enabled when only $\sigma_e$ arrives. An enabled transition can be executed. The execution of an enabled transition e at the state $(o_e, d)$ causes P to transit to the location $t_e$, the data value is updated to $f_e(d,u)$, the output variable is assigned the value $h_e(d,u)$, and a discrete output $\delta_e$ is emitted.

3. Atomic-Blocks: Minimal Simulink Diagrams

Simulink provides a library of blocks, which can be used as minimal systems, and the corresponding Simulink diagrams will then be minimal Simulink diagrams. We refer to such blocks as atomic blocks. The atomic-blocks can be composed in a recursive fashion to construct more complex Simulink diagrams, and we discuss the rules of composition in the next section.

An atomic-block can be stateful or stateless. A stateful block's output depends on the history of its inputs. An example of a stateful block is the Unit Delay block. On the other hand, the output of a stateless block depends only on its current inputs. An example of a stateless block is the Gain block, which simply outputs its input signal, multiplied with a constant called the gain.

An atomic-block can be classified as continuous-time versus discrete-time, and is associated with a sample-period. For a continuous-time block, sample-period is the time between the instants when it is numerically simulated. For a discrete-time block, sample-period is the time between the instants when the corresponding discrete-time system evolves.

An atomic-block can be defined as follows.
Definition 2 An atomic Simulink block $\psi$ can be represented as a tuple $$(U^\psi, Y^\psi, D^\psi, D_0^\psi, \{(G_i^\psi, f_i^\psi, h_i^\psi)\}_{i=1}^{q^\psi}, (T^\psi, T_o^\psi)),$$

where
  $U^\psi = U_1^\psi \times \ldots \times U_m^\psi$ is the set of typed inputs,
  $Y^\psi = Y_1^\psi \times \ldots \times Y_p^\psi$ is the set of typed outputs,
  $D^\psi = D_1^\psi \times \ldots \times D_n^\psi$ is the set of typed data,
  $D_0^\psi \subset D^\psi$ is the set of initial data conditions,
  $\{(G_i^\psi, f_i^\psi, h_i^\psi)\}_{i=1}^{q^\psi}$ is a set of triples, where
    $G_i^\psi \subset D^\psi \times U^\psi$ is a predicate representing an enabling guard, such that $\vee_{i=1}^{q^\psi} G_i = \text{True}$,
    $f_i^\psi: D^\psi \times U^\psi \to D^\psi$ is a data-update function,
    $h_i^\psi: D^\psi \times U^\psi \to Y^\psi$ is an output-assignment function.
  $T^\psi$ is the sample period and $T_o^\psi$ is an offset (it is assumed zero by default if unspecified).
Remark 1 The kth sampling time occurs at $kT^\psi + T_o^\psi$. The value of the input signal at the kth sampling time is denoted as $u(k)=(u_1(k), \ldots, u_m^\psi(k)) \in U^\psi$, and similarly for other signals. At the kth sampling time, if the data $d(k)$ and the input $u(k)$ are such that $G_i^\psi(d(k),u(k))$ holds, the next data, $d(k+1)=f_i^\psi(d(k),u(k))$, is computed, and the output value is assigned to $y(k)=h_i^\psi(d(k),u(k))$. Note that for continuous-time blocks, the data-update and output-assignment functions correspond to the ones obtained through discretization at sample times using an appropriate integration method. Simulink allows different kinds of sample period that include Discrete, Continuous, Inherited (−1), Constant (inf) and Triggered etc. Discrete sample periods are the only kind for which the evolution times of the corresponding system are known a priori. For blocks with other kinds of sample period, Simulink determines the evolution times of the corresponding system from the block's type or by its context within the model during the compilation phase of simulation. Given a Simulink diagram, the sample period of a non continuous-time block can be obtained from the get_param (object, 'CompiledSample-Time') command after compiling the diagram. The sample-period of a continuous-time block, which is used in discretization, can be chosen to be the greatest common divisor of all non continuous-time blocks using the following rule [3]: for $1 \leq i, j \leq n$, $$T^\psi = \begin{cases} gcd(\{T^{\psi_i}\}) & \text{if } T_o^{\psi_i} = T_o^{\psi_j} \\ gcd(\{T^{\psi_i}, T_o^{\psi_i}\}) & \text{otherwise} \end{cases},$$

and $T_o^\psi = \begin{cases} T_o^{\psi_i} & \text{if } T_o^{\psi_i} = T_o^{\psi_j} \\ 0 & \text{otherwise.} \end{cases}$ Also note for a stateless atomic-block $\psi$, the set $D^\psi$ is empty (and accordingly, there are no initial data conditions or data-update functions).

The following example illustrates the Definition 2.

Example 1

The Integrator block provides a continuous-time integration of the input signal. It models the relations, $\dot{d}(t)=u(t)$ with $d(0)=d_0$, and $y(t)=d(t)$, where u is its input, d is its data, y is its output, t is the continuous-time variable, and $d_0$ is the initial data condition. Using Euler's Method the discretization is $d(k+1)=d(k)+T^\psi u(k)$. Thus, the Integrator block can be represented as:

$(u, y, d, d_0, \{(-, d(k+1)=d(k)+T^\psi u(k), y(k)=d(k))\}, (T^\psi, T_o^\psi))$, where $T^\psi$ is the sample-period and $T_0^\psi$ is an offset.

Note that the Integrator block can be configured further by setting certain parameters to have a more complex behavior. An example is the Integrator block $\psi_5$ in FIG. 3. In Example 1 we did not include this much detail for the sake of simplicity of illustration.

We introduce the following concepts for the computation of an atomic block over sample times.
Definition 3 Given an atomic-block $\psi$ and an input $u \in U^\psi$, we call the computation of the corresponding output $y \in Y^\psi$ a step of $\psi$ over u. y is called the output of a step of $\psi$ over u. Given an input sequence $\{u(k)\}_{k=0}^K$, a step-trajectory of $\psi$ over $\{u(k)\}_{k=0}^K$ is a sequence of steps of $\psi$, where the kth step $(0 \leq k \leq K)$ in the sequence is over the input $u(k)$. Letting $y(k)$ $(0 \leq k \leq K)$ denote the output of $\psi$ over $u(k)$, $\{y(k)\}_{k=0}^K$ is called the output of step-trajectory of $\psi$ over $\{u_k\}_{k=0}^K$.

4. System-Blocks: Simulink Diagrams

A Simulink diagram, also called a system-block, can be constructed by recursively composing atomic-blocks and other simpler system-blocks according to certain rules. The following two rules are the among the rules that Simulink uses for the construction of complex Simulink diagrams from the simpler ones:

Connecting-rule: A certain input of one system-block can be connected to a certain output of another system-block. The connections over a set of system-blocks $\Psi$ can be represented using a relation $C \subseteq (\Psi \times N)^2$, where N denotes the set of port numbers. A connection $c=((\psi_1, i),(\psi_2,j)) \in C$ connects the output port i of system-block $\psi_1$ to an input port j of system-block $\psi_2$. The "C-connected $\Psi$ system" thus formed is denoted $\Psi/C$. Note a possible choice for connections is the "null-connection", and $\{\psi\}/\emptyset = \psi$.

Conditioning-rule: A system-block can be made conditionally executable when a certain guard condition over certain variables, called control-inputs, holds. Further the data may be reset when the guard condition holds, and the output may be reset when the guard condition is violated. Given a system-block $\psi$, a conditioning over $\psi$ is a 5-tuple $$\theta := (U^\theta, G^\theta, f^\theta, h^\theta, (T^\theta, T_o^\theta)),$$

where
$U^\theta = U_1^\theta \times \ldots \times U_m^\theta$ is the set of conditioning-inputs (also called control-inputs),
$G^\theta \subset U^\theta$ is a condition (predicate) over $U^\theta$,
$f^\theta : \overline{D^\psi} \to D^\psi$ is a data-resetting function,
$h^\theta : Y^\psi \to Y^\psi$ is an output-resetting function, and
$T^\theta$ is a sample-period, $T_o^\theta$ is an offset.

When $G^\theta$ holds, $\psi$ computes, and otherwise, $h^\theta$ assigns the output. Also, when $G^\theta$ becomes true, the first computation of $\psi$ is preceded by a data-update by $f^\theta$. The "$\theta$-conditioned $\psi$" system thus formed is denoted $\psi \Downarrow \theta$.

The conditioning-rule can be implemented by placing a system-block inside a certain Subsystem block (of Simulink Library) which can be configured to specify the conditioning parameters. Note a possible choice for conditioning is "null-conditioning", denoted $\bot := (-, \text{True}, \text{id}, \text{id}, \infty)$, in which case $\psi \Downarrow \bot = \psi$. (Here id denotes the identity function.)

Next we formally define the class of Simulink diagrams (also referred to as system-blocks) formed using the above rules.

Definition 4 A certain class of Simulink diagrams (also referred to as system-blocks) is recursively defined as follows.
1. $\psi$ is an atomic-block, then $\psi$ is a system-block.
2. $\Psi$ is a set of system-blocks, $C \subseteq (\Psi \times N)^2$ is a set of interconnections, then C-connected $\Psi$, denoted $\Psi/C$, is a system-block.
3. $\psi$ is a system-block and $\theta$ is a conditioning over $\psi$, then $\theta$-conditioned $\psi$, denoted $\psi \Downarrow \theta$, is a system-block.

Remark 2 For a system-block $\overline{\psi} := \Psi/C$, we have:
inputs $U^{\overline{\psi}} = \Pi_{\exists((,,),(\psi,i)) \in C} U_i^\psi$,
outputs $Y^{\overline{\psi}} = \Pi_{\psi \in \Psi} Y^\psi$,
data $D^{\overline{\psi}} = \Pi_{\psi \in \Psi} D^\psi$,
initial data $D_0^{\overline{\psi}} = \Pi_{\psi \in \Psi} D_0^\psi$, and
sample-period, $T^{\overline{\psi}}$ and offset $T_o^{\overline{\psi}}$ are obtained using the rule defined in Remark 1 over $\{T^\psi, T_o^\psi | \psi \in \Psi\}$.

Note the above definition of $T^{\overline{\psi}}$ ensures that each computation of each system-block $\psi \in \Psi$ coincides with some computation of the connected system-block $\overline{\psi}$ (i.e., no computation of any system-block is missed).

Similarly, for a system-block $\overline{\psi} := \Downarrow \theta$ we have:
inputs $U^{\overline{\psi}} = U^\psi \times U^\theta$,
outputs $Y^{\overline{\psi}} = Y^\psi$,
data $D^{\overline{\psi}} = D^\psi$,
initial data $D_0^{\overline{\psi}} = D_0^\psi$,
sample-period $$T^{\overline{\psi}} = \begin{cases} T^\theta & \text{if } T^\theta \text{ specified} \\ T^\psi & \text{otherwise} \end{cases},$$

and offset $T_o^{\overline{\psi}} = \begin{cases} T_o^\theta & \text{if } T^\theta \text{ specified} \\ T_o^\psi & \text{otherwise.} \end{cases}$ Note by the Simulink grammar, for a system-block $\overline{\psi} := \psi \Downarrow \theta$, $T^\theta$ is either specified and in which case $T^{\overline{\psi}}$ is inherited to be $T^\theta$, or is unspecified and in which case $T^{\overline{\psi}}$ is inherited to be $T^\psi$. Similarly for $T_o^{\overline{\psi}}$.

Example 2

Consider the Simulink diagram $\psi$ of a counter shown in FIG. 1, where the Unit Delay block $\psi_5$ is a discrete-time atomic-block and the block $\psi_1$ is an Enabled Subsystem block. The output $y_5$ increases by 1 at each sample-period when the control input u is positive, and $y_5$ resets to its initial value when the control input u is not positive. The Saturation block $\psi_2$ limits the value of $y_5$ in the range between $-0.5$ and 7. The sample-period of $\psi_5$ is 0.01 seconds and others are either constant (inf) or inherited ($-1$). $T_o^{\psi_5} = 0$ by default since unspecified. Using get_param command after compiling $\psi$, $T^\psi = T^{\psi_i} = 0.01$ for i=1, 2, 3, 4, 5. $\psi$ belongs to the class of Simulink diagrams defined in Definition 4:

$$\psi = \{\psi_1, \psi_2\}/C_1,$$

where
$\psi_1 = (\{\psi_3, \psi_4, \psi_5\}/C_2) \Downarrow \theta$, where
$C_2 = \{((\psi_3, \bullet), (\psi_4, \bullet)), ((\psi_4, \bullet), (\psi_5, \bullet)), (\psi_5, \bullet), (\psi_4, \bullet))\}$,
$\theta = (U^\theta, u^\theta(k) > 0, d(k) = d_0, (y_3(k), y_4(k), y_5(k)) = (-, -, y_{50}), -)$
$C_1 = \{((\psi_1, \bullet), (\psi_2, \bullet))\}$, and
$\psi_2, \psi_3, \psi_4, \psi_5$ are atomic-blocks.

Note since we choose the Pulse type of the source block Pulse Generator to be Time based, $\psi$ is a single-rate Simulink diagram. Thus the source block for generating the inputs and the sink block Scope for displaying the outputs are not considered as part of the Simulink diagram being translated, and hence not included in $\psi$. If the Pulse type of the source block is chosen to be Sample based and the sample time is different from 0.01, then $\psi$ becomes a multirate Simulink diagram.

Example 3

Figure 2:
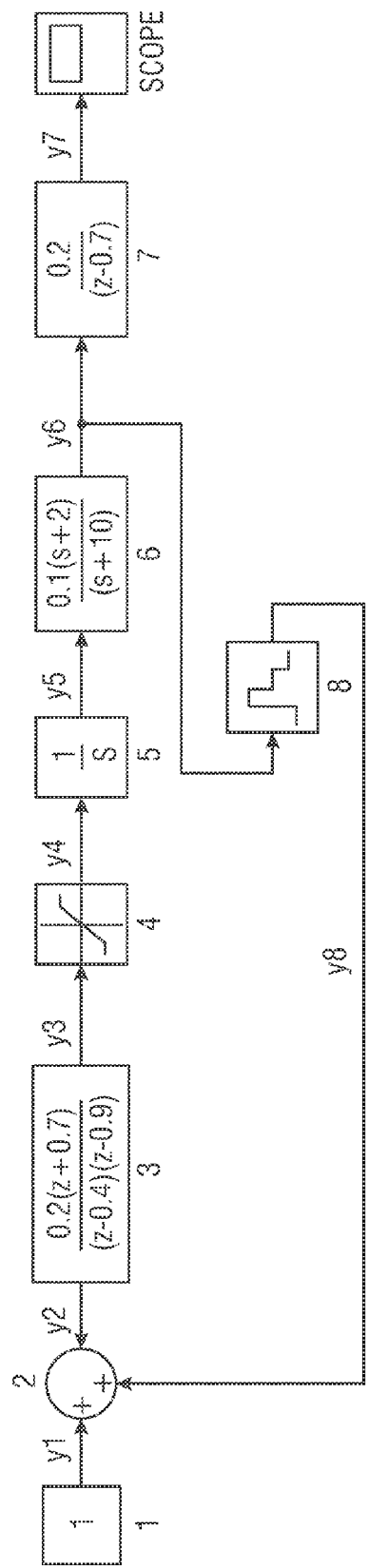
FIG. 2 is a multirate simulink diagram.

Consider the multirate Simulink diagram $\psi$ shown in FIG. 2, where blocks $\psi_3$ and $\psi_7$ are discrete-time blocks with sample-period of 0.01 and 0.025 seconds, respectively. The Zero-Order Hold block $\psi_8$ is also a discrete-time block that samples the incoming signal at 0.01. Blocks $\psi_5$ and $\psi_6$ are continuous-time blocks. The sample-periods of other blocks are either constant (inf) or inherited ($-1$). All offsets are 0 by default since unspecified. Thus, $T^{\psi_i} = 0.01$ for i=1, 2, 3, 4, 8 and $T^{\psi_7} = 0.025$. Since $\gcd(0.01, 0.025) = 0.005$, we opt to discretize $\psi_5$ and $\psi_6$ at a sample-period of 0.005. Then $T^{\psi_5} = T^{\psi_6} = 0.005$, and also $T^\psi = 0.005$.

$\psi$ belongs to the class of Simulink diagrams defined in Definition 4: $\psi = \Psi/C$, where $\Psi = \{\psi_1, \psi_2, \psi_3, \psi_4, \psi_5, \psi_6, \psi_7, \psi_8\}$ and C is omitted. $U = \emptyset$, $D = D_3 \times D_5 \times D_6 \times D_7$ with $D_0 = \{(0, 0, 0, 0)\}$. Note the sink block Scope for displaying the outputs is not considered as part of the Simulink diagram being translated, and hence not included in $\psi$.

Example 4

Figure 3:
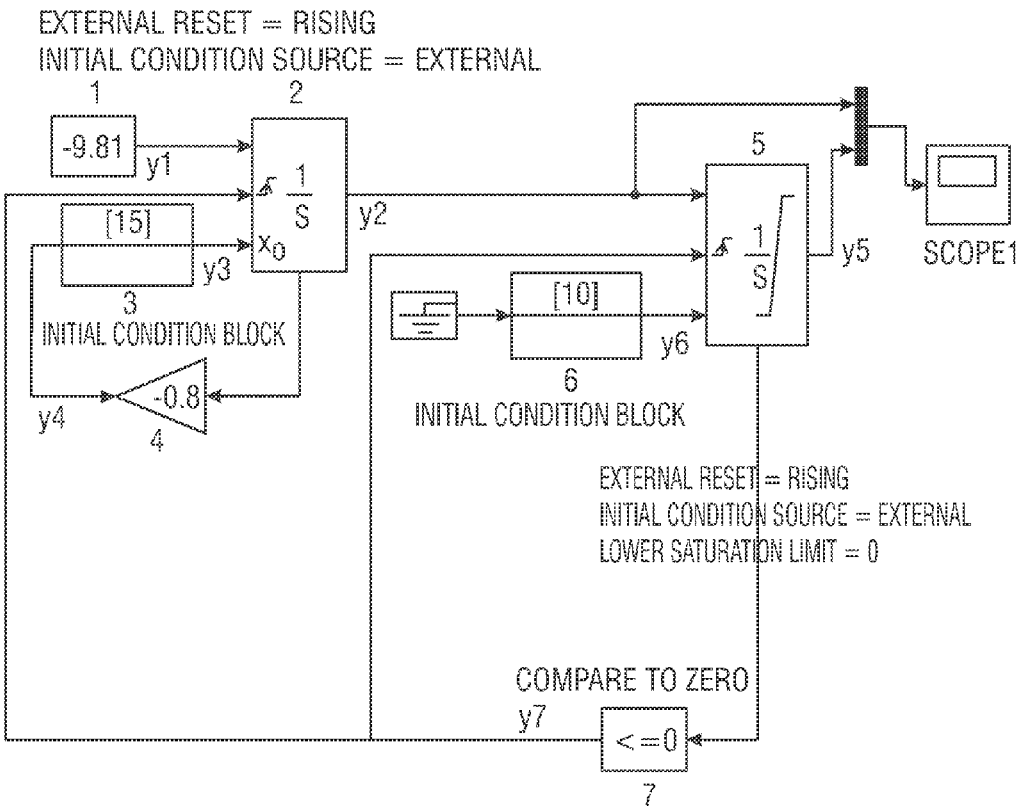
FIG. 3 is a simulink diagram of bouncing ball.

Consider the Simulink diagram $\psi$ of a bouncing ball shown in FIG. 3. $\psi$ models a hybrid-system of a bouncing ball that is thrown up with an initial velocity of 15 m/s from an initial height of 10 m. $y_5$ (resp., $y_2$) is the position (resp., velocity) of the ball. $\psi_2$ and $\psi_5$ are continuous-time blocks. We have opted to discretize $\psi_2$ and $\psi_5$ at a sample period of 0.01. The sample-periods of other blocks are either constant (inf) or inherited (−1). Then $T^\psi = T^{\psi_i} = 0.01$ for 1, ..., 7. $\psi$ belongs to the class of Simulink diagrams defined in Definition 4: $\psi = \Psi/C$,
where $\Psi = \{\psi_1, \psi_2, \psi_3, \psi_4, \psi_5, \psi_6, \psi_7\}$ and C is omitted. $U=\emptyset$, $D = D_1 \times D_2$ with $D_0 = \{(15, 10)\}$.

4.1 Sorted-Order

When system-blocks are composed using the connecting-rule to form a more complex system-block, the input of one system-block becomes the output of another system-block. To respect the interdependency of the inputs/outputs, Simulink defines and uses the notion of an execution-order (which it refers as sorted-order) to determine the order in which the system-blocks included inside a connected system-block are executed. Note that the conditioning-rule does not require defining a sorted-order since it is applied to a single system-block.

Given a system-block $\Psi/C$ formed using the connecting-rule, the sorted-order of the system-blocks $\{\psi \in \Psi\}$ is given as an ordering function Ord: $\Psi \to N$, where N is the set of natural numbers. The sorted-order induces a total-order over $\Psi$, i.e., for $\psi, \psi' \in \Psi$, Ord($\psi$)=Ord($\psi'$) if and only if $\psi=\psi'$. Accordingly $\psi \in \Psi$ is executed before $\psi' \in \Psi$ if Ord($\psi$)<Ord($\psi'$). The sorted-order value Ord($\psi$) can be displayed, as part of a label ascribed to a system-block $\psi \in \Psi$, by selecting the option Sorted Order from Simulink Block Displays menu. Assuming, without loss of generality of correctness of translation, that the Optimization on Conditional Execution Behaviors is turned off, the label ascribed to $\psi$ has the format: Id($\Psi/C$): Ord($\psi$): {Id($\psi$)}, where Id is a function that associates a certain identifier number to a system-block. The {Id($\psi$)} part may be missing if $\psi$ an atomic-block. Whenever we need to indicate the label ascribed to $\psi \in \Psi$, we write it in the form: $\psi$ [Id($\Psi/C$): Ord($\psi$){Id($\psi$)}].

The notion of sorted-order is essential in defining the step of a system-block.

Definition 5 Given a system-block $\psi$ and an input $u \in U^\psi$, the step of $\psi$ over u is recursively defined as follows:
- If $\psi$ is an atomic-block, then the step of $\psi$ over u is as defined in Definition 3.
- If $\psi = \Psi/C$ is a connected system-block, then for $j^{min} \le j \le j^{max}$, where $j^{min} = \min\{\text{Ord}(\psi): \psi \in \Psi\}$ and $j^{max} = \max\{\text{Ord}(\psi): \psi \in \Psi\}$, letting $\psi_j \in \Psi$ denote the system-block with Ord($\psi_j$)=j, a step of $\psi$ over u is a sequence of steps, whose jth element is the step of $\psi_j \in \Psi$ over $u_j$, the input of $\psi_j$ as determined by the set of connections C.
- If $\psi = \psi' \Downarrow \theta$ is a conditioned system-block, then a step of $\psi$ over u is the step of $\psi'$ over u if $G^\theta$ holds, and otherwise it is the execution of the output-resetting function $h^\theta$. Also when $G^\theta$ becomes true, the first execution of the step of $\psi'$ over u is preceded by the execution of the data-resetting function $f^\theta$.

Given an input sequence $\{u(k)\}_{k=0}^K$, a step-trajectory of $\psi$ over $\{u(k)\}_{k=0}^K$ is a sequence of steps of $\psi$, where the kth step (0≤k≤K) in the sequence is over the input u(k). Letting y(k) (0≤k≤K) denote the output of $\psi$ over u(k), $\{y(k)\}_{k=0}^K$ is called the output of step-trajectory of $\psi$ over $\{u_k\}_{k=0}^K$.

Note in the $2^{nd}$ item of Definition 5, when $kT^\psi + T_o^\psi = k^{\psi_j} T^{\psi_j} + T_o^{\psi_j}$ a step of $\psi_j$ is computed by $h_i^{\psi_j}$ if $G_i^{\psi_j}$ holds, and $k^{\psi_j}$ increases when k increases; otherwise when $kT^\psi + T_o^\psi \ne k^{\psi_j} T_o^{\psi_j} + T_o^{\psi_j}$, the output of $\psi_j$ remains its previous value, and $k^{\psi_j}$ remains unchanged when k increases.

Example 5

Consider the Simulink diagram of $\psi$ the counter shown in FIG. 1 that was also discussed in Example 2, and its sorted-order displayed in FIG. 1. We have $$\psi = \Psi_1/C_1 = \{\psi_1[0:1\{1\}], \psi_2[0:2]\}/C_1,$$

$$\psi_1 = (\Psi_2/C_2) \Downarrow \theta = (\{\psi_3[1:0], \psi_4[1:2], \psi_5[1:1]\}/C_2) \Downarrow \theta.$$

Then according to Definition 5 we have:
A step of $\psi = \{\psi_1, \psi_2\}/C_1$ is a step of $\psi_1$ followed by a step of $\psi_2$ since Ord($\psi_1$)<Ord($\psi_2$)=2.
A step of $\psi_1 = (\{\psi_3, \psi_4, \psi_5\}/C_2) \Downarrow \theta$ is obtained as follows: If $G^\theta$ holds, the sequence of steps of $\psi_3, \psi_5, \psi_4$ is executed since Ord($\psi_3$)=0<Ord($\psi_5$)=1<Ord($\psi_4$)=2; and otherwise, $h^\theta$ computes. Also when $G^\theta$ becomes true, the first execution of the sequence of steps of $\psi_3, \psi_5, \psi_4$ is preceded by the computation of $f^\theta$.

Example 6

Consider the multirate Simulink diagram $\psi$ of FIG. 2 that was also discussed in Example 3, and its sorted-order displayed in FIG. 2. It can be seen that $$\psi = \{\psi_1[0:2], \psi_2[0:6], \psi_3[0:7], \psi_4[0:8], \psi_5[0:3], \psi_6[0:4], \psi_7[0:0], \psi_8[0:5]\}/C.$$

It then follows that a step of $\psi$ is the sequence of steps of $\psi_7$, $\psi_1, \psi_5, \psi_6, \psi_8, \psi_2, \psi_3$ and $\psi_4$. Note for j=1, ..., 8, a step of $\psi_j$ is computed whenever $kT^\psi = k^{\psi_j} T^{\psi_j}$, and otherwise, $\psi_j$ retains its previous values of the data and the output.

Example 7

Consider the Simulink diagram $\psi$ of the bouncing ball of FIG. 3 that was also discussed in Example 4, and its sorted-order displayed in FIG. 3. It can be seen that $$\psi = \{\psi_1[0:7], \psi_2[0:3], \psi_3[0:2], \psi_4[0:1], \psi_5[0:5], \psi_6[0:4], \psi_7[0:0]\}/C.$$

It then follows that a step of $\psi$ is the sequence of steps of $\psi_7$, $\psi_4, \psi_3, \psi_2, \psi_6, \psi_5$ and $\psi_1$.

5. Semantic Translation of Simulink Diagrams

We describe how a Simulink diagram can be semantically translated to an I/O-EFA.

For any system-block $\psi$, its I/O-EFA model is obtained by connecting two I/O-EFA models, one for output-assignments and other for state-updates. We use $l_{0-}^\psi, l_{m-}^\psi$ to denote the initial/final location for first I/O-EFA, and $l_{0+}^\psi, l_{m+}^\psi$ to denote the initial/final location for second I/O-EFA. The two I/O-EFA's are connected using two edges:
- succession-edge connecting the final location $l_{m-}^\psi$ of the first I/O-EFA to the initial location $l_{0+}^\psi$ to of the second I/O-EFA, and
- time-advancement edge connecting the final location $l_{m+}^\psi$ of the second I/O-EFA to the initial location $l_{0-}^\psi$ to of the first I/O-EFA that increments time: k:=k+1.

Figure 4:
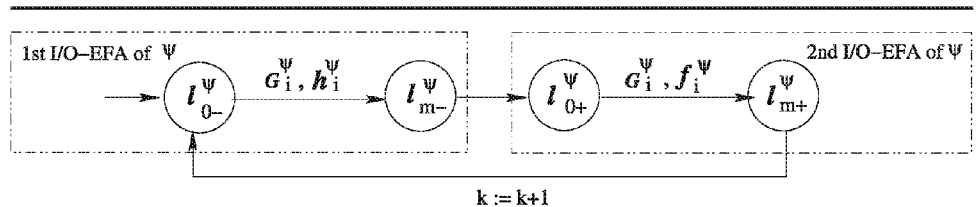
FIG. 4 is I/O-EFA model of atomic-block $\psi$.

Translating Atomic-Blocks. FIG. 4 depicts the two I/O-EFA models connected by the succession and time-advancement edges for an atomic-block $\psi$. A formal description of the translation is provided in the following algorithm.

Algorithm 1 For an atomic-block $\psi=(U^\psi, Y^\psi, D^\psi, D_o^\psi, \{(G_i^\psi, f_i^\psi, h_i^\psi)\}_{i=1}^{q^\psi}, (T^\psi, T_o^\psi))$, The 1st I/O-EFA of $\psi$ is $$P_-^\psi=(L_-^\psi,-,U^\psi,Y^\psi,-,-,l_{0-}^\psi,-,l_{m-}^\psi,E_-^\psi),$$

where
$L_-^\psi=\{l_{0-}^\psi, l_{m-}^\psi\}$ and
$E_-^\psi=\{(l_{0-}^\psi, l_{m-}^\psi, -, -, G_i^\psi, -, h_i^\psi) | i \leq q^\psi\}$.

The 2nd I/O-EFA of $\psi$ is $$P_+^\psi=(L_+^\psi,D^{P\psi},U^\psi,Y^\psi,-,-,l_{0+}^\psi,D_0^{P\psi},l_{m+}^\psi,E_+^\psi),$$

where
$L_+^\psi=\{l_{0+}^\psi, l_{m+}^\psi\}$,
$D^{P\psi}:=D^\psi \times K$ is the set of data, where K is the set of sampling times,
$D_0^{P\psi}:=D_0^\psi \times \{0\}$ is the set of initial-data conditions, and
$E_+^\psi=\{(l_{0+}^\psi, l_{m+}^\psi, -, -, G_i^\psi, f_i^\psi, -) | i \leq q^\psi\}$.

Note that $f^\psi$="nul" if $\psi$ is a stateless block.

The combined I/O-EFA model of $\psi$ is $$P^\psi=(L^\psi,D^{P\psi},U^\psi,Y^\psi,-,-,l_0^\psi,D_0^{P\psi},l_m^\psi,E^\psi),$$

where
$L^\psi=L_-^\psi \cup L_+^\psi$,
$l_0^\psi=l_{0-}^\psi$,
$l_m^\psi=l_{m+}^\psi$, and
$E^\psi=E_-^\psi \cup E_+^\psi \cup \{(l_{m-}^\psi, l_{0+}^\psi, -, -, -, -, -)\} \cup \{(l_{m+}^\psi, l_{0-}^\psi, -, -, -, -, k=k+1)\}$.

Figure 5:
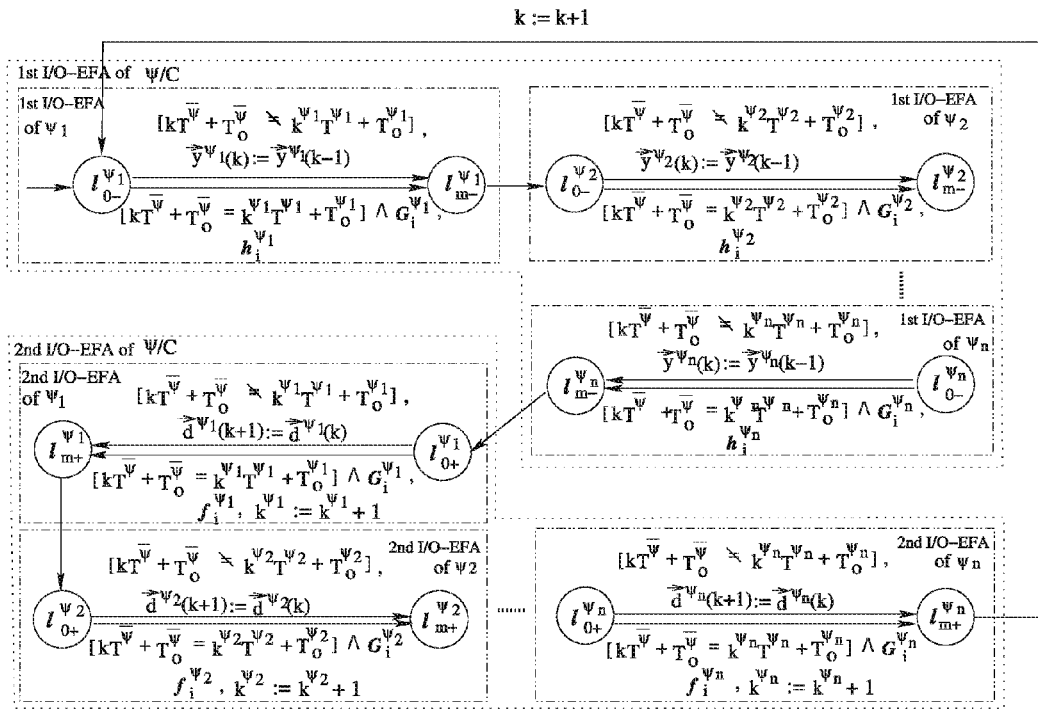
FIG. 5 is I/O-EFA model of system-block $\bar{\psi}=\Psi/C$.

Translating for Connecting-rule. In the I/O-EFA models of a connected system-block $\bar{\psi}=\Psi/C$, the initial and final locations of the first (resp., second) I/O-EFA are the initial and final locations of the first (resp., second) I/O-EFA model of $\psi \in \Psi$ that has the smallest and largest Ord($\psi$)-value in $\Psi$, respectively. Also in order to preserve the sorted-order, there is an edge from the final location of the first (resp., second) I/O-EFA of $\psi \in \Psi$ to the initial location of the first (resp., second) I/O-EFA of $\psi' \in \Psi$ if and only if Ord($\psi'$)=Ord($\psi$)+1. Also in order to allow multirate system-blocks within a connected system-block, certain "bypass" edges are introduced within each system-block $\psi \in \Psi$ connecting the initial location $l_{0-}^\psi$ (resp., $l_{0+}^\psi$) and final location $l_{m-}^\psi$ (resp., $l_{m+}^\psi$) of the first (resp., second) I/O-EFA of $\psi$. These edges are guarded by $\lfloor kT\bar{\psi}+T_o^{\bar{\psi}} \neq k^\psi T^\psi+T_o^\psi \rfloor$, implying that will be bypassed at those values of k when $kT\bar{\psi}+T_o^{\bar{\psi}}$ is not equal to $k^\psi T^\psi+T_o^\psi$. In contrast, the converse guard condition of $\lfloor kT^{\bar{\psi}}+T_o^{\bar{\psi}}=k^\psi T^\psi+T_o^\psi \rfloor$ is introduced for the original set of edges originating at $l_{0-}^\psi$ and $l_{0+}^\psi$. An illustration of the translating of $\bar{\psi}=\Psi/C$ is depicted in FIG. 5, whereas a formalization is presented in Algorithm 2.

Without loss of generality, we assume that if $((\psi, i),(\psi, j)) \in C$, then $y_i^\psi=u_j^\psi$, i.e., the same variable has been used to denote the two signals.

Algorithm 2 For a connected system-block $\bar{\psi}=\Psi/C$,

The 1st I/O-EFA of $\bar{\psi}$ is $$P_-^{\bar{\psi}}=(L_-^{\bar{\psi}},D_-^{P\bar{\psi}},U^{\bar{\psi}},Y^{\bar{\psi}},-,-,l_{0-}^{\bar{\psi}},D_{0-}^{P\bar{\psi}},l_{m-}^{\bar{\psi}},E_-^{\bar{\psi}}),$$

where
$L_-^{\bar{\psi}}:=\cup_{\psi \in \Psi} L_-^\psi$,
$D_-^{P\bar{\psi}}:=K \times \Pi_{\psi \in \Psi} K^\psi \times T^{\bar{\psi}} \times T_0^{\bar{\psi}} \times \Pi_{\psi \in \Psi} T^\psi \times \Pi_{\psi \in \Psi} T_o^\psi$,
$U^{\bar{\psi}}$ and $Y^{\bar{\psi}}$ are as defined in first part of Remark 2,
$l_{0-}^{\bar{\psi}}=l_{0-}^\psi$ such that Ord($\psi$)=min{Ord($\psi$):$\psi \in \Psi$},
$D_{0-}^{P\bar{\psi}}=\{0\} \times \Pi_{\psi \in \Psi}\{0\} \times T^{\bar{\psi}} \times T_0^{\bar{\psi}} \times \Pi_{\psi \in \Psi} T^\psi \times \Pi_{\psi \in \Psi} T_o^\psi$,
$l_{m-}^{\bar{\psi}}:=l_{m-}^\psi$ such that Ord($\psi$)=max{Ord($\psi$):$\psi \in \Psi$}, and $E_-^{\bar{\psi}}=\cup_\psi \{(l_{0-}^\psi, l_{m-}^\psi, -, -, \lfloor kT^{\bar{\psi}}+T_o^{\bar{\psi}}=k^\psi T^{\psi+T}_o^\psi \rfloor \hat{} G_i^\psi, -, h_i^\psi) | i \leq q^\psi\}$
$\cup_{\{(l_{0-}^\psi, l_{m-}^\psi, -, -, \lfloor kT^{\bar{\psi}}+T_o^{\bar{\psi}} \neq k^\psi T^{\psi+T}_o^\psi \rfloor, -, y^\psi(k)=y^\psi(k-1))\}}$
$\cup \{(l_{m-}^\psi, l_{0-}^{\psi'}, -, -, -, -, -)|Ord(\psi')=Ord(\psi)+1 \leq |\Psi|$, and $\psi, \psi' \in \Psi\}$.

The 2nd I/O-EFA of $\bar{\psi}$ is $$P_+^{\bar{\psi}}=(L_+^{\bar{\psi}},D_+^{P\bar{\psi}},U^{\bar{\psi}},Y^{\bar{\psi}},-,-,l_{0+}^{\bar{\psi}},D_{0+}^{P\bar{\psi}},l_{m+}^{\bar{\psi}},E_+^{\bar{\psi}}),$$

where
$L_+^{\bar{\psi}}:=\cup_{\psi \in \Psi} L_+^\psi$,
$D^{P\bar{\psi}}:=D^{\bar{\psi}} \times K \times \Pi_{\psi \in \Psi} K^\psi \times T^{\bar{\psi}} \times T_o^{\bar{\psi}} \times \Pi_{\psi \in \Psi} T^\psi \times \Pi_{\psi \in \Psi} T_o^\psi$,
where $D^{\bar{\psi}}$ is as defined in first part of Remark 2,
$U^{\bar{\psi}}$ and $Y^{\bar{\psi}}$ are as defined in first part of Remark 2,
$l_{0+}^{\bar{\psi}}=l_{0+}^\psi$ such that Ord($\psi$)=min{Ord($\psi$): $\psi \in \Psi$},
$D_{0+}^{P\bar{\psi}}=D_0^{\bar{\psi}} \times \{0\} \times \Pi_{\psi \in \Psi}\{0\} \times T^{\bar{\psi}} \times T_o^{\bar{\psi}} \times \Pi_{\psi \in \Psi} T^\psi \times \Pi_{\psi \in \Psi} T_o^\psi$,
where $D_0^{\bar{\psi}}$ is as defined in first part of Remark 2,
$l_{m+}^{\bar{\psi}}:=l_{m+}^\psi$ such that Ord($\psi$)=max{Ord($\psi$): $\psi \in \Psi$}, and
$E_+^{\bar{\psi}}=\cup_\psi \{(l_{0+}^\psi, l_{m+}^\psi, -, -, \lfloor kT^{\bar{\psi}}+T_o^{\bar{\psi}}=k^\psi T^\psi+T_o^\psi \rfloor \hat{} G_i^\psi, (d^\psi(k+1), k^\psi)=(\theta_i^\psi, k^\psi+1), -)|i \leq q^\psi\}$
$\cup_\psi \{(l_{0+}^\psi, l_{m+}^\psi, -, -, \lfloor kT^{\bar{\psi}}+T_o^{\bar{\psi}} \neq k^\psi T^\psi+T_o^\psi \rfloor, d^\psi(k+1)=d^\psi(k), -)\}$
$\cup \{(l_{m+}^\psi, l_{0+}^{\psi'}, -, -, -, -, -)|Ord(\psi')=Ord(\psi)+1 \leq |\Psi|$, and $\psi, \psi' \in \Psi\}$.

The combined I/O-EFA of $\bar{\psi}$ is $$P^{\bar{\psi}}=(L^{\bar{\psi}},D^{P\bar{\psi}},U^{\bar{\psi}},Y^{\bar{\psi}},-,-,l_0^{\bar{\psi}},D_0^{P\bar{\psi}},l_m^{\bar{\psi}},E^{\bar{\psi}}),$$

where
$L^{\bar{\psi}}:=L_-^{\bar{\psi}} \cup L_+^{\bar{\psi}}$,
$D^{P\bar{\psi}}=D_+^{P\bar{\psi}}$,
$l_0^{\bar{\psi}}=l_{0-}^{\bar{\psi}}$,
$D_0^{P\bar{\psi}}=D_{0+}^{P\bar{\psi}}$,
$l_m^{\bar{\psi}}:=l_{m+}^{\bar{\psi}}$, and
$E^{\bar{\psi}}=E_-^{\bar{\psi}} \cup E_+^{\bar{\psi}} \cup \{(l_{m-}^{\bar{\psi}}, l_{0+}^{\bar{\psi}}, -, -, -, -, -)\} \cup \{(l_{m+}^{\bar{\psi}}, l_{0-}^{\bar{\psi}}, -, -, -, -, k=k+1)\}$.

Remark 3 If $\bar{\psi}$ is a single-rate system-block, then the I/O-EFA model of $\bar{\psi}=\Psi/C$ presented in Algorithm 2 can be simplified since in this case $T^{\bar{\psi}}=T^\psi$ and $T_o^{\bar{\psi}}=T_o^\psi$ for each $\psi \in \Psi$ and so $kT\bar{\psi}+T_o^{\bar{\psi}}=k^\psi T^\psi+T_o^\psi$ for each k. Accordingly $$E_-^{\bar{\psi}}=\cup_\psi E_-^\psi \cup \{(l_{m-}^\psi, l_{0-}^{\psi'}, -, -, -, -, -)|Ord(\Psi')=Ord(\Psi)+1 \leq |\Psi|, \text{ and } \psi, \psi' \in \Psi\}, \text{ and}$$

$$E_+^{\bar{\psi}}=\cup_\psi E_+^{\psi \cup \{(l_{m+}^\psi, l_{0+}^{\psi'}, -, -, -, -, -)|Ord(\Psi')=Ord(\Psi)+1 \leq |\Psi|, \text{ and } \psi, \psi' \in \Psi\}}.$$

Example 8

Figure 6:
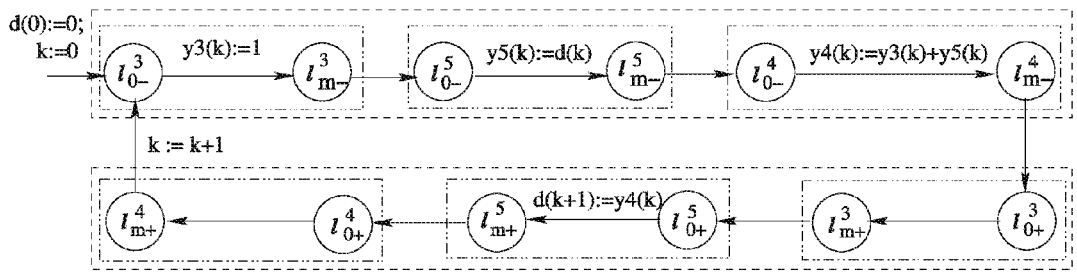
FIG. 6 is I/O-EFA model of $\Psi_2/C_2$ of Example 2.

Consider $\Psi_2/C_2=\{\psi_3, \psi_4, \psi_5\}/C_2$ of Example 2, where Ord($\psi_3$)<Ord($\psi_5$)<Ord($\psi_4$). The I/O-EFA model for $\Psi_2/C_2$, obtained using Algorithm 2 for the connecting-rule and Remark 3, is shown in FIG. 6. The dotted boxes contain the 1st/2nd I/O-EFAs of $\psi \in \Psi_2$, and also of $\Psi_2/C_2$.

Example 9

Figure 7:
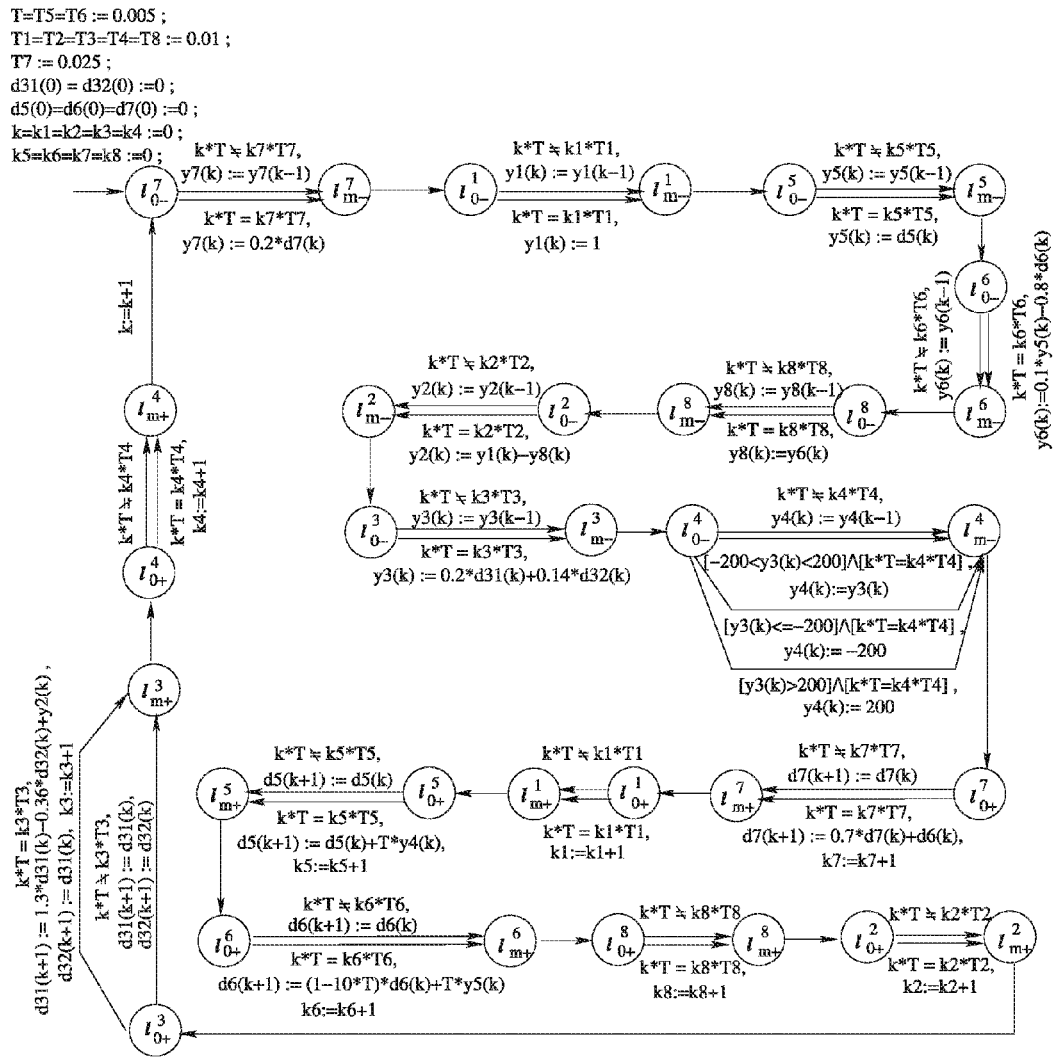
FIG. 7 is I/O-EFA model of multirate Simulink diagram of Example 3.
Figure 8:
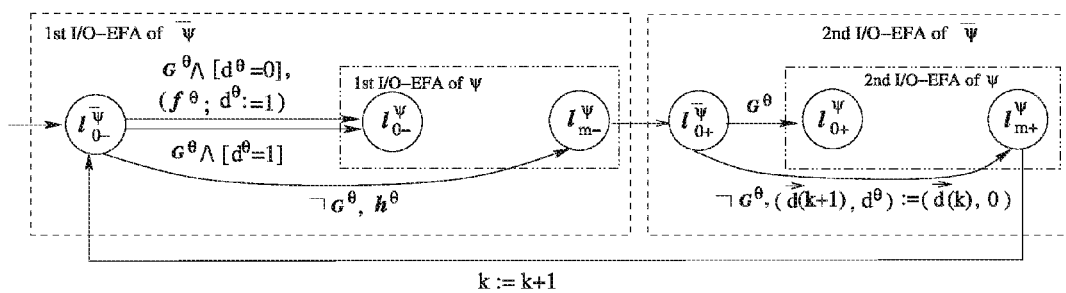
FIG. 8 is I/O-EFA model of system-block $\bar{\psi}=\psi \Downarrow \theta$.

Consider the multirate Simulink diagram of FIG. 2 that was discussed in Example 3. The I/O-EFA model of $\psi$, obtained using Algorithm 2 for the connecting-rule, is shown in FIG. 7. Translating for Conditioning-rule. In the translation of a conditioned system-block $\bar{\psi}=\psi \Downarrow \theta$, the 1st I/O-EFA of $\bar{\psi}$ is the 1st I/O-EFA of $\psi$ together with (i) a newly added location $l_{0-}^{\bar{\psi}}$, that also serves as the initial location of the first I/O-EFA model of $\bar{\psi}$, (ii) two newly added edges for capturing the conditional execution of $\psi$, and (iii) a "bypass edge" when the condition $G^\theta$ doesn't hold. The 2nd I/O-EFA of $\overline{\psi}$ is the 2nd I/O-EFA of $\psi$ together with (i) a newly added location $l_{0+}^{\overline{\psi}}$, that also serves as the initial location of the second I/O-EFA model of $\overline{\psi}$, (ii) a newly added edge for capturing the conditional execution of $\psi$, and (iii) a "bypass edge" when the condition $G^\theta$ doesn't hold. An extra binary-valued data-variable $d^\theta$, with initial value 0, is introduced to keep track of the period over which $G^\theta$ holds. An illustration of the translating of $\overline{\psi} = \psi \Downarrow \theta$ is depicted in FIG. 8, whereas a formalization is presented in Algorithm 3.

Algorithm 3 For a conditioned system-block $\overline{\psi} = \psi \Downarrow \theta$,
The 1st I/O-EFA model of $\overline{\psi}$ is $$P_-^{\overline{\psi}} = (L_-^{\overline{\psi}}, D^\theta, U^{\overline{\psi}}, Y^{\overline{\psi}}, -, -, l_{0-}^{\overline{\psi}}, D_0^\theta, l_{m-}^{\overline{\psi}}, E_-^{\overline{\psi}}),$$

where
$L_-^{\overline{\psi}} = L_-^{\psi} \cup \{l_{0-}^{\overline{\psi}}\}$,
$D^\theta = \{0, 1\}$,
$U^{\overline{\psi}}$ and $Y^{\overline{\psi}}$ are as defined in second part of Remark 2,
$D_0^\theta = \{0\}$,
$l_{m-}^{\overline{\psi}} = l_{m-}^{\psi}$, and
$E_-^{\overline{\psi}} = E_-^{\psi} \cup \{(l_{0-}^{\overline{\psi}}, l_{0-}^{\psi}, -, -, G^{\theta^\wedge}[d^\theta = 0], (f^\theta; d^\theta := 1), -)\} \cup \{(l_{0-}^{\overline{\psi}}, l_{0-}^{\psi}, -, -, G^{\theta^\wedge}[d^\theta = 1], -, -)\} \cup \{(l_{0-}^{\overline{\psi}}, l_{m-}^{\psi}, -, -, \Downarrow G^\theta, -, h^\theta)\}$.

The 2nd I/O-EFA model of $\overline{\psi}$ is $$P_+^{\overline{\psi}} = (L_+^{\overline{\psi}}, D^{P^{\overline{\psi}}}, U^{\overline{\psi}}, Y^{\overline{\psi}}, -, -, l_{0+}^{\overline{\psi}}, D_0^{P^{\overline{\psi}}}, l_{m+}^{\overline{\psi}}, E_+^{\overline{\psi}}),$$

where
$L_+^{\overline{\psi}} = L_+^{\psi} \cup \{l_{0+}^{\overline{\psi}}\}$,
$D^{P^{\overline{\psi}}} = D^{P^{\psi}} \times D^\theta$,
$D_0^{P^{\overline{\psi}}} = D_0^{P^{\psi}} \times D_0^\theta$,
$l_{m+}^{\overline{\psi}} = l_{m+}^{\psi}$, and
$E_+^{\overline{\psi}} = E_+^{\psi} \cup \{(l_{0+}^{\overline{\psi}}, l_{0+}^{\psi}, -, -, G^\theta, -, -)\} \cup \{(l_{0+}^{\overline{\psi}} l_{m+}^{\psi}, -, -, \Downarrow G^\theta, (d^\psi(k+1), d^\theta) = (d^\psi(k), 0), -)\}$.

The combined I/O-EFA model of $\overline{\psi}$ is $$P^{\overline{\psi}} = (L^{\overline{\psi}}, D^{P^{\overline{\psi}}}, U^{\overline{\psi}}, Y^{\overline{\psi}}, -, -, l_0^{\overline{\psi}}, D_0^{P^{\overline{\psi}}}, l_m^{\overline{\psi}}, E^{\overline{\psi}}),$$

where
$L^{\overline{\psi}} = L_-^{\overline{\psi}} \cup L_+^{\overline{\psi}}$,
$l_0^{\overline{\psi}} = l_{0-}^{\overline{\psi}}$,
$l_m^{\overline{\psi}} = l_{m+}^{\overline{\psi}}$, and
$E^{\overline{\psi}} = E_-^{\overline{\psi}} \cup E_+^{\overline{\psi}} \cup \{(l_{m-}^{\psi}, l_{0+}^{\psi}, -, -, -, -, -)\} \cup \{(l_{m+}^{\psi}, l_{0-}^{\psi}, -, -, -, -, k=k+1)\}$.

Remark 4 Algorithms 1, 2 and 3 provide translation under the fixed-step simulation semantics of Simulink. The algorithms can be modified to follow the variable-step simulation semantics as well. The variable-step solvers in the Simulink dynamically increase (or reduce) the step size (i.e., the value of $T^{\overline{\psi}}$) if the error exceeds (or falls under) a specific limit $Er_{ceiling}$ (or $Er_{floor}$) To see the modification, suppose the error calculation formula is $f_e(y^{\overline{\psi}}(k), y^{\overline{\psi}}(k-1), \ldots, T^{\overline{\psi}})$. Then the time-advancement edge $(l_{m+}^{\psi}, l_{0-}^{\overline{\psi}}, -, -, -, -, k=k+1)$ will be replaced by the following set of edges:

$$\{(l_{m+}^{\psi}, l_{0-}^{\overline{\psi}}, -, -, [f_e \Downarrow Er_{ceiling}], T^{\overline{\psi}} = T^{\overline{\psi}}/2, k=k+1), (l_{m+}^{\psi}, l_{0-}^{\overline{\psi}}, -, -, [\theta_e \Downarrow Er_{floor}], T^{\overline{\psi}} = 2*T^{\overline{\psi}}, k=k+1)$$

$$(l_{m+}^{\psi}, l_{0-}^{\overline{\psi}}, -, -, [Er_{floor} \Downarrow f_e \Downarrow Ef_{ceiling}], -, k=k+1)\}.$$

Example 10

Figure 9:
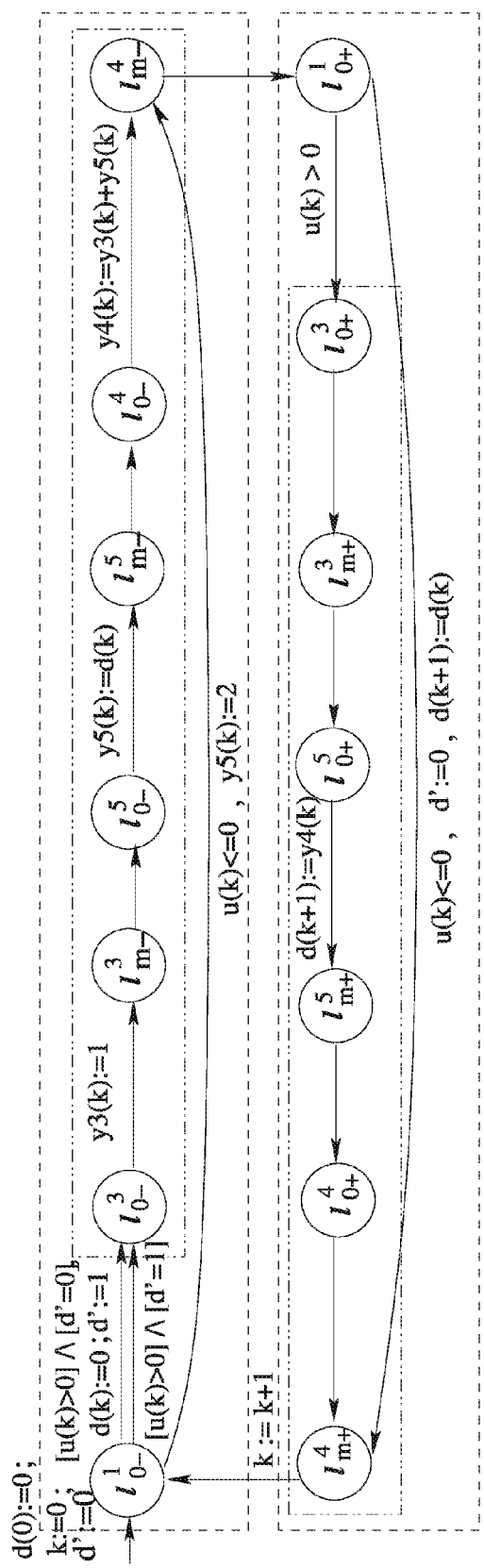
FIG. 9 is I/O-EFA model of $\Psi_1$ of Example 2.

Consider $\psi_1 = (\Psi_2/C_2) \Downarrow \theta$ of Example 2. The I/O-EFA model of $\Psi_2/C_2$ was obtained in Example 8, and the I/O-EFA model of $\psi_1$, obtained using Algorithm 3 for the conditioning-rule, is shown in FIG. 9. The dotted boxes contain the 1st/2nd I/O-EFAs of $\Psi_2/C_2$, and also of $\psi_1$.

Example 11

Figure 10:
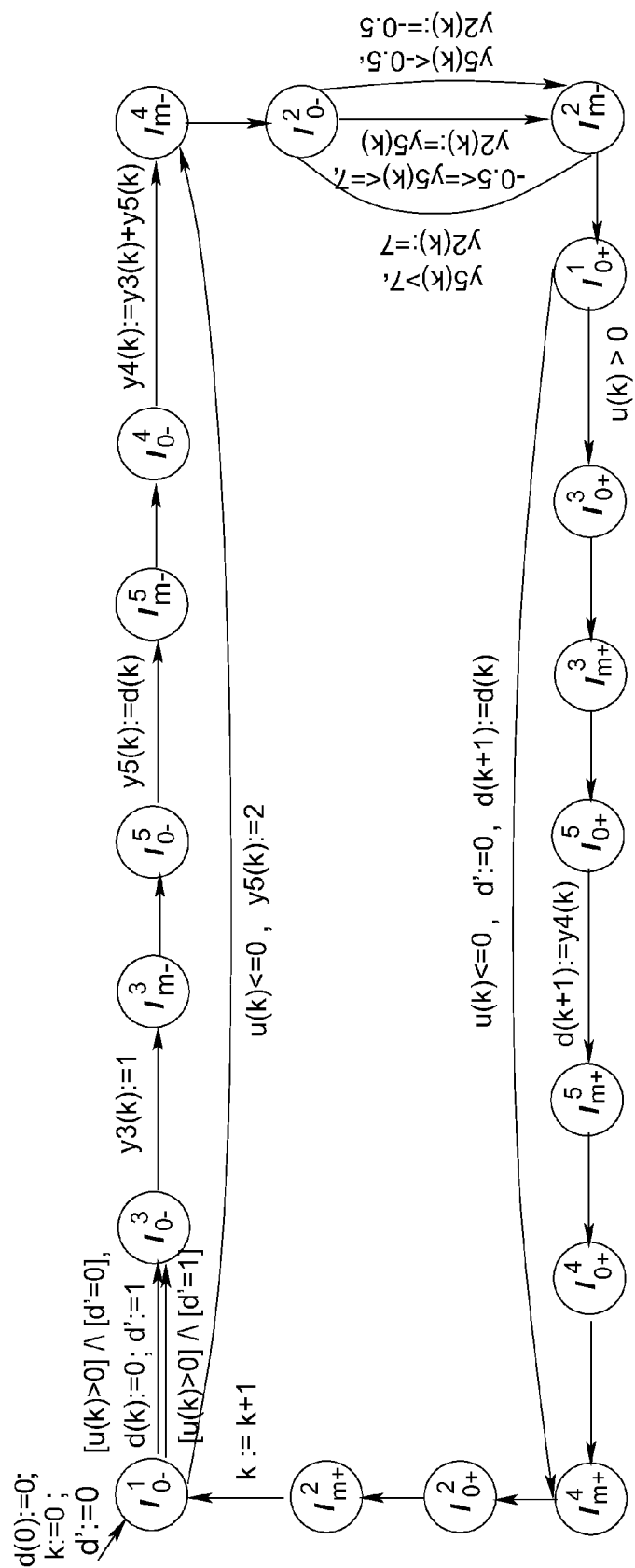
FIG. 10 is I/O-EFA model of counter of Example 2.

Consider the Simulink diagram $\psi = \{\psi_1, \psi_2\}/C$ of the counter shown in FIG. 1 that was also discussed in Example 2. The I/O-EFA model for $\psi_1$ was obtained in Example 10, and the I/O-EFA model of $\psi$, obtained using Algorithm 2 for the connecting-rule and Remark 3, is shown in FIG. 10.

Figure 11:
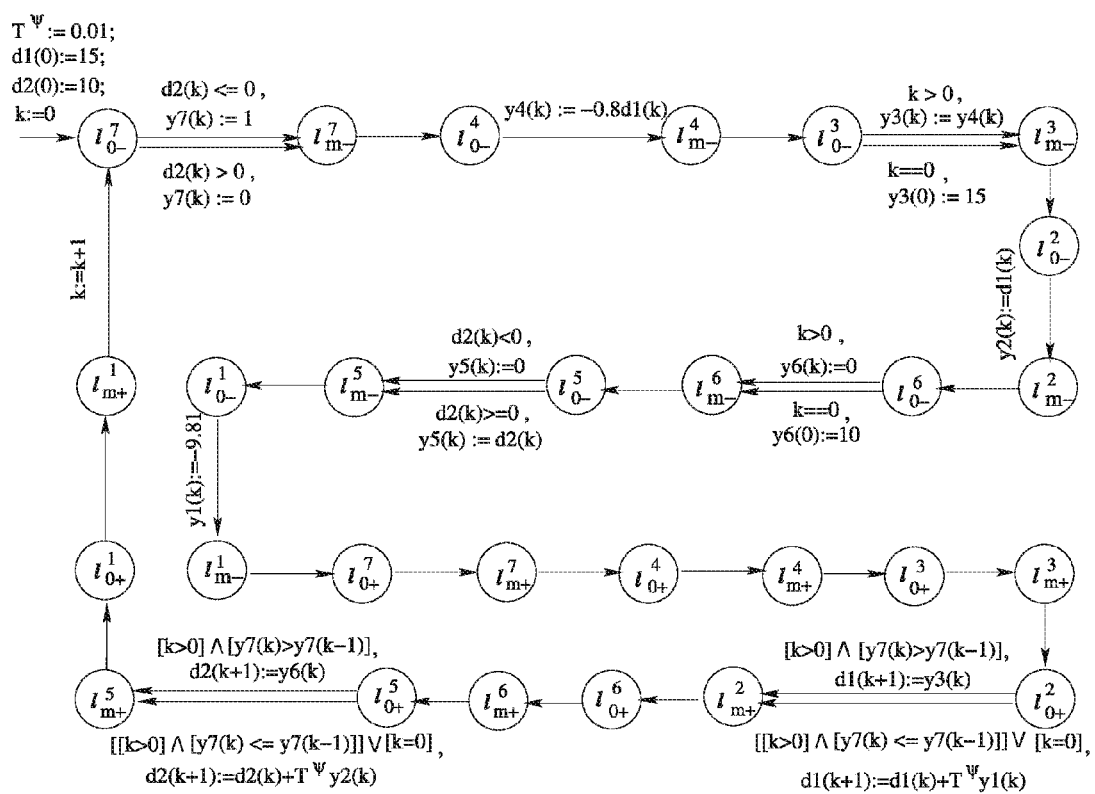
FIG. 11 is I/O-EFA model of bouncing ball of Example 4.

Consider the Simulink diagram $\psi$ of the bouncing ball of FIG. 3, and also discussed in Example 4. The I/O-EFA model of $\psi$, obtained using Algorithm 2 for the connecting-rule and Remark 3, is shown in FIG. 11.

6. Validation of Translating Approach

In order to show that the translating approach is sound and complete, we introduce the concept of a step and of a step-trajectory of an I/O-EFA model of a system-block. In the I/O-EFA model $P^\psi$ of a system-block $\psi$, each increment of k corresponds to an execution of a path $\pi = (l_0^\psi, \ldots, l_m^\psi, l_0^\psi)$. A computation along the kth execution of such a path gives an output value y(k) for an input u(k).

Definition 6 Given an I/O-EFA model $P^\psi$ of a system-block $\psi$ and input $u \in U^\psi$, a step of $P^\psi$ over u is the computation of a sequence of edges starting from $l_0^\psi$ and ending at $l_m^\psi$, followed by the time-advancement edge. Given an input sequence $\{u(k)\}_{k=0}^K$, a step-trajectory of $P^\psi$ over $\{u(k)\}_{k=0}^K$ is a sequence of steps, where the kth step ($0 \le k \le K$) in the sequence is over the input u(k). Letting y(k) ($0 \le k \le K$) denote the output of $\psi$ over u(k), $\{y(k)\}_{k=0}^K$ is called the output of step-trajectory of $P^\psi$ over $\{u_k\}_{k=0}^K$.

Next we show that the input-output behavior of an I/O-EFA model at a sampling time, defined in terms of a step, preserves the input-output behavior of the corresponding Simulink diagram at the same sampling time, defined in terms of a step.

Lemma 1 Given a system-block $\psi$ and an input u(k) and at the kth sampling time, let $y^\psi(k)$ and $y^{P^\psi}(k)$ be the outputs of the steps of $\psi$ and $P^\psi$, respectively, over u(k). Then $y^\psi(k) = y^{P^\psi}(k)$, where $P^\psi$ is obtained from the Algorithms 1, 2 and 3.

Proof: If $\psi$ is an atomic-block, then from Algorithm 1 and Definitions 5 and 6, a step of both $\psi$ and $P^\psi$ at the kth sampling time k compute: $y^\psi(k) = h_i^\psi(d(k), u(k))$, where $$d(k) = \begin{cases} f_i^\psi(d(k-1), u(k-1)) & \text{if } k > 0 \\ d_0 & \text{otherwise} \end{cases},$$

if $G_i^\psi(d(k), u(k))$ holds, and
$i \le q^\psi$.

If $\psi = \Psi/C$, then from Algorithms 2 and Definitions 5 and 6, a step of both $\psi$ and $P^\psi$ over u(k) at the kth sampling time compute $(y^{\psi_j min}(k), \ldots, y^{\psi_j}(k), \ldots, y^{\psi_j max}(k))$, where $\psi_j \in \Psi$ and:

(i) If $kT^\psi + T_o^\psi = k^{\psi_j} T^{\psi_j} + T_o^{\psi_j} : y^{\psi_j}(k) = (d(k), u(k))$, where $$d(k) = \begin{cases} f_i^{\psi_j}(d(k-1), u(k-1)) & \text{if } k > 0 \\ d_0 & \text{otherwise} \end{cases}$$

if $G_i^{\psi_j}(d(k), u(k))$ holds,
$i \le q^{\psi_j}$, and
$u_r^{\psi_j}(k) = y_s^{\psi_j}(k)$ if $((\psi_j, r), (\psi_j, s)) \in C$ (ii) If $kT^\psi + T_o^\psi \ne k^{\psi_j} + T_o^{\psi_j} : y^{\psi_j}(k) = y^{\psi_j}(k-1)$.

If $\overline{\psi}=\psi \Downarrow \theta$, then from Algorithms 3 and Definitions 5 and 6, a step of both $\psi$ and $P^\psi$ over u(k) at the kth sampling time compute:

$$y^{\overline{\psi}}(k) = \begin{cases} h_i^\psi(d^\psi(k), u^\psi(k)) & \text{if } G^\theta(u(k)) \wedge G_i^\psi(d^\psi(k), u^\psi(k)) \text{ holds,} \\ h^\theta(d^\psi(k), u^\psi(k)) & \text{otherwise,} \end{cases}$$

where $$d^\psi(k) = \begin{cases} \begin{cases} f^\theta(d^\psi(k-1), u^\psi(k-1)) & \text{if } k > 0 \\ d_0^\psi & \text{otherwise} \end{cases} & \text{if } G^\theta(u(k)) \text{ becomes true at the } kth \text{ sampling time} \\ f_i^\psi(d^\psi(k-1), u^\psi(k-1)) & \text{if } G^\theta(u(k)) \text{ remains true} \\ \begin{cases} d^\psi(k-1) & \text{if } k > 0 \\ d_0^\psi & \text{otherwise} \end{cases} & \text{otherwise} \end{cases}$$

The following proposition shows that the input-output behavior of an I/O-EFA model over a sequence of sampling times, defined in terms of a step-trajectory, preserves the input-output behavior of the corresponding Simulink diagram over the same sequence of sampling times, defined in terms of a step-trajectory.

Proposition 1 Given a system-block $\psi$ and an input sequence $\{u(k)\}_{k=0}^K$, let $\{y^{\overline{\psi}}(k)\}_{k=0}^K$ and $\{y^{P^\psi}(k)\}_{k=0}^K$ be the outputs of step-trajectories of $\psi$ and $P^\psi$, respectively, over $\{u(k)\}_{k=0}^K$. Then $\{y^{\overline{\psi}}(k)\}_{k=0}^K = \{y^{P^\psi}(k)\}_{k=0}^K$, where $P^\psi$ is as obtained from the Algorithms 1, 2 and 3.

Proof: The proof follows from Lemma 1 and Definitions 5 and 6.

Example 12

Figure 12:
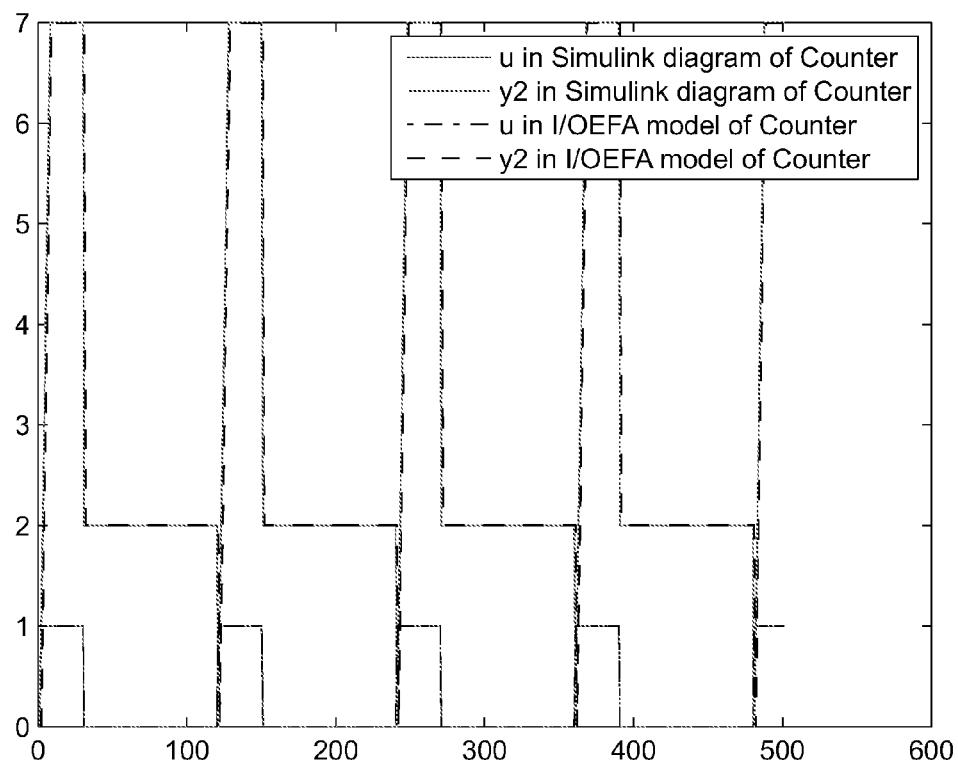
FIG. 12 is Simulation of counter of Example 2 and its I/O-EFA model in FIG. 10.

To validate our model, a simulation for a certain input sequence (pulse with period 1.2 second and pulse width 25%) was obtained for the Simulink diagram $\psi$ of FIG. 1 (using fixed-step discrete solver) and is shown in FIG. 12. The simulation of the I/O-EFA model $P^\psi$ was done in Stateflow. Since a step of $P^\psi$ is defined to be the execution of a cycle starting from and ending at the initial location and visiting the final location once, the sample period for the Stateflow model of $P^\psi$ was scaled down by the length of the cycle (the number of locations of $P^\psi$). The simulation result of $P^\psi$ (using fixed-step discrete solver) is also shown in FIG. 12.

Figure 13:
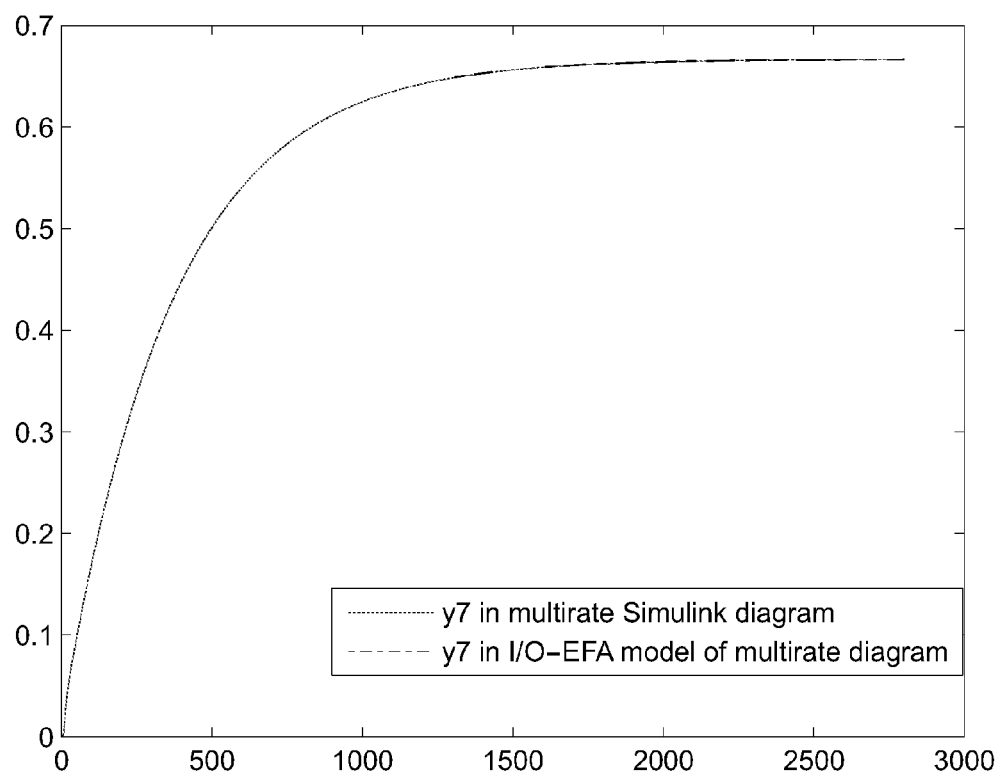
FIG. 13 is Simulation of multirate Simulink diagram Example 3 and I/O-EFA model in FIG. 7.

A simulation was obtained for the multirate Simulink diagram $\psi$ of FIG. 2 (using fixed-step continuous solver odel Euler) and is shown in FIG. 13. The simulation of the I/O-EFA model $P^\psi$ was done in Stateflow (note the computer cannot check the equality of two floating numbers, one way to handle this is to duplicate the set of $T^\psi$s and $T_o^\psi$s, relabel and amplify them to make them integers). Recall $T^\psi=0.005$. The sample-period for the Stateflow model of $P^\psi$ was scaled down by the number of locations of $P^\psi$. The simulation result of $P^\psi$ (using fixed-step discrete solver) is also shown in FIG. 13.

Figure 14:
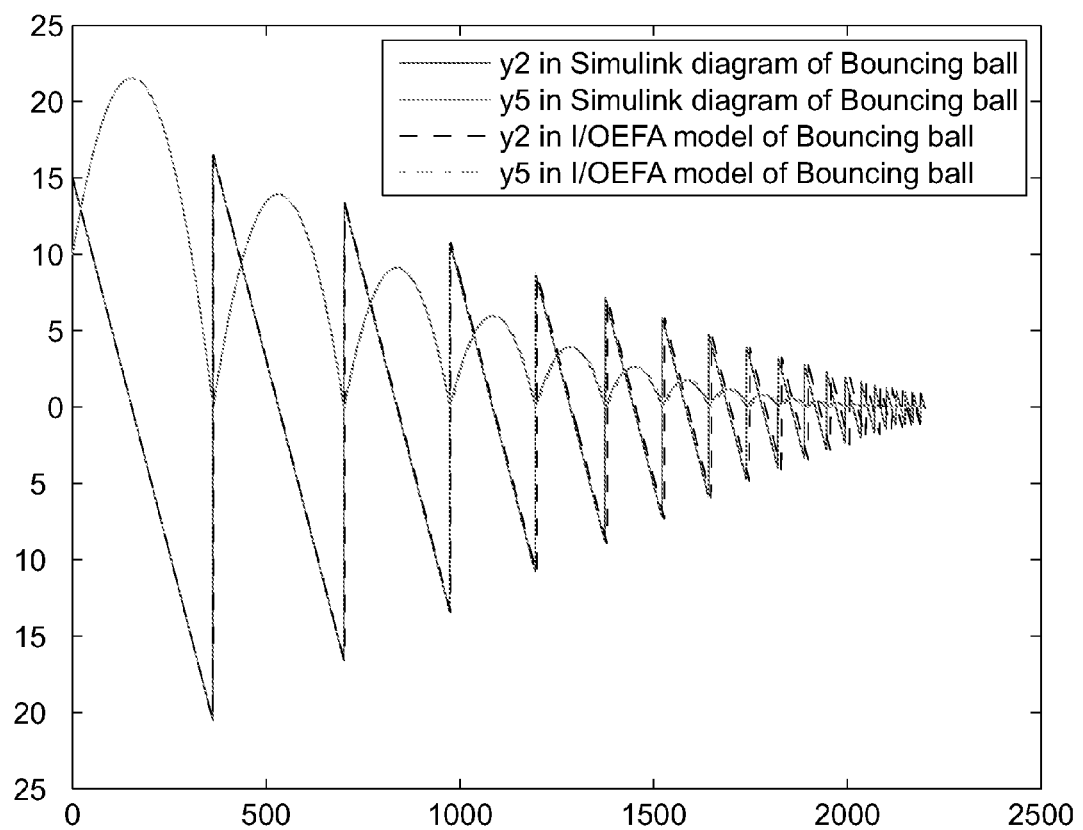
FIG. 14 is Simulation of bouncing ball of Example 4 and its I/O-EFA model in FIG. 11.

A simulation was obtained for the Simulink diagram $\psi$ of FIG. 3 (using fixed-step continuous solver odel Euler) and is shown in FIG. 14. The simulation of the I/O-EFA model $P^\psi$ was done in Stateflow. Recall the sample-period of $\psi$ is 0.01. The sample-period for the Stateflow model of $P^\psi$ was scaled down by the number of locations of $P^\psi$. The simulation result of $P^\psi$ (using fixed-step discrete solver) is also shown in FIG. 14.

7. Related Work

We briefly introduce the works related to ours, discussing succinctly their features. [4] presented a translation algorithm for converting a restricted subclass of S/S diagrams into a semantically equivalent hybrid automaton. For the subclass of S/S diagrams considered there exists a clear separation between the discrete and the continuous dynamics: All mode changes are made through switches, and whose controlling variables are restricted to be the outputs of the Stateflow modules. In general, however, the discrete modes do not have to be determined by the output variables of the Stateflow modules, and switches do not have to be used to switch continuous dynamics. Our approach does not require a clear separation between discrete and continuous dynamics for modeling hybrid systems. Also our translation approach has no special restriction on the types of Simulink blocks. The approach supports virtually all blocks in Simulink Library (in this work we only consider time-driven blocks) provided that the block can be mathematically written as input-state-output functions over time. [5] described a translation scheme for deriving hybrid automata models from S/S models. However, no formal algorithms are provided. We presented formal algorithms for the translation. [3, 6, 13] describes a technique for translating discrete-time Simulink diagrams into Lustre programs. Lustre is a synchronous language and the translation is a mapping between elements of Simulink diagrams (for example, signals and atomic blocks) and Lustre programs (for example, flows and operators/nodes). The execution sequence of Simulink blocks in the Lustre programs is determined by Lustre compiler. Also only the discrete-time blocks are translated. In our approach, the execution sequence of Simulink blocks is directly captured in the I/O-EFA models. Also, our approach supports virtually all time-driven blocks in Simulink Library. [7] mentioned a translation of S/S diagrams into the language of "SAL [1] for the purposes of test generation. However, the details of the translation were not given. [8] reported translation of Simulink diagrams to a model of concurrent processes communicating with FIFO queues or registers, called SPI model, in contrast to I/O-EFA model in our approach. There has also been work on code-generation for simulink diagrams [12, 11]. One emphasis is in intellectual property reuse (i.e., code reuse for a group of atomic blocks) and so their approach is modular. In contrast we focus on formal modeling of Simulink diagrams with the goal of providing models that are readily amenable for further analysis (verification, test-generation, etc.).

8. Conclusion

We presented a recursive approach for translating a class of Simulink diagrams as input/output-extended finite automata (I/O-EFA), which is amenable to automated test generation or verification. We treat the blocks in the Simulink library to be "atomic" and formulate two rules used in Simulink for building complex blocks by combining the simpler ones. We provided a recursive and formal definition for the class of Simulink diagrams formed using these rules.

We presented algorithms for (i) translating an atomic-block as an I/O-EFA, (ii) combining the I/O-EFA models of simpler Simulink diagrams to build the I/O-EFA model of a more complex Simulink diagram, constructed using certain rules of composition. We introduced the concept of a step (resp., step-trajectory) of an I/O-EFA to emulate the computation of a Simulink diagram at a sample time (resp., over a sequence of sample times). We showed that the translating approach is sound and complete: The input-output behavior of an I/O-EFA model, as defined in terms of a step-trajectory preserves the input-output behavior of the corresponding Simulink diagram at each sample time (assuming the same integration method for any of the continuous blocks with dynamics). Finally, the translation approach has no specific restriction on the types of Simulink blocks or the structure of Simulink diagrams supported and can handle multirate Simulink diagrams, sample times with initial offsets and variable-step simulation etc.

Although various embodiments have been shown and described in detail, the present invention is not to be limited to the specific embodiments shown as the present invention contemplates numerous variations, options, and alternatives in its implementation as may be appropriate in various situations. For example, the present invention contemplates that different types of diagrams may be used. The methodology may be implemented in various types of computing devices using any number of types of software to provide instruction sets for performing the logic of the methodologies described herein.

REFERENCES

References below are incorporated by reference in their entireties.

[1] Sal homepage. http://sal.csl.sri.com/.
[2] Simulink. http://www.mathworks.com/products/simulink/.
[3] P. Caspi, A. Curic, A. Maignan, C. Sofronis, and S. Tripakis. Translating discrete-time simulink to lustre. *Lecture Notes in Computer Science*, 2855:84-99, 2003.
[4] A. Agrawal, G. Simon, and G. Karsai. Semantic translation of simulink/stateflow models to hybrid automata using graph transformations. *Electronic Notes in Theoretical Computer Science*, 109:43-56, December 2004.
[5] R. Alur, A. Kanade, S. Ramesh, and K. C. Shashidhar. Symbolic analysis for improving simulation coverage of simulink/stateflow models. In *EMSOFT '08: Proceedings of the 7th ACM international conference on Embedded software*, pages 89-98, New York, N.Y., USA, 2008. ACM.
[6] P. Caspi, A. Curic, A. Maignan, C. Sofronis, S. Tripakis, and P. Niebert. From simulink to scade/lustre to tta: a layered approach for distributed embedded applications. *SIGPLAN Not.*, 38(7):153-162, 2003.
[7] A. Gadkari, S. Mohalik, K. C. Shashidhar, J. Suresh A Yeolekar, and S. Ramesh. Automatic generation of test cases using model checking for sl/sf models. *Workshop on Model-Driven Engineering, Verification, and Validation*, 2007.
[8] M. Jersak, D. Ziegenbein, F. Wolf, K. Richter, R. Ernst, F. Cieslog, J. Teich, K. Strehl, and L. Thiele. Embedded system design using the spi workbench. In *Proc. of the 3rd International Forum on Design Languages*, 2000.
[9] R. Kumar, C. Zhou, and S. Basu. Finite bisimulation of reactive untimed infinite state systems modeled as automata with variables. In *Proceedings of the 25th American Control Conference*, pages 6057-6062, Minneapolis, Minn., June 2006.
[10] D. Lee and M. Yannakakis. Principles and methods of testing finite state machines—a survey. *Proceedings of the IEEE*, 84(8):1090-1123, 1996.
[11] R. Lublinerman, C. Szegedy, and S. Tripakis. Modular code generation from synchronous block diagrams—modularity vs. code size. In *POPL '09*, 2009.
[12] R. Lublinerman and S. Tripakis. Modular code generation from triggered and timed block diagrams. In *Real-Time and Embedded Technology and Applications Symposium (RTAS'08)*, 2008.
[13] N. Scaife, C. Sofronis, P. Caspi, S. Tripakis, and F. Maraninchi. Defining and translating a "safe" subset of simulink/stateflow into lustre. In *Proc. EMSOFT'04*, 2004.
[14] T. Takenaka, K. Okano, T. Higashino, and K. Taniguchi. Symbolic model checking of extended finite state machines with linear constraints over integer variables. *Syst. Comput. Japan,* 37(6):64-72, 2006.
[15] C. Zhou and R. Kumar. On identification of input/output extended automata with finite bisimilar quotients. In 2009 *American Control Conference*, St. Louis, Mo., June 2009.

What is claimed is:

1. A method of semantic translation of a diagram associated with a graphical modeling environment into an input/output-extended finite automata (I/O-EFA) model, the method comprising:
   receiving a representation of the diagram at a computing device;
   processing the representation of the diagram with the computing device by (a) representing all atomic blocks in said diagram as a tuple, (b) representing the diagram using a connecting rule and a conditioning rule, (c) determining an order in which the blocks included inside the diagram are executed, (d) translating the atomic blocks into the I/O-EFA model using a first algorithm, and (e) translating for the connecting rule and the condition rule using a second algorithm and a third algorithm, respectively to thereby modify the I/O-EFA model; and
   storing the I/O-EFA model on a non-transitory computer readable storage medium.

2. The method of claim 1 wherein the step of processing is performed by the computing device according to an instruction set stored on the non-transitory computer readable storage medium.

3. The method of claim 1 wherein the diagram is a diagram associated with a graphical block diagramming tool.

4. The method of claim 1 wherein the diagram represents a hybrid system combining event-driven discrete and time-dependent continuous behaviors.

5. The method of claim 1 wherein the diagram represents a system with time-dependent continuous behaviors and wherein the input/output-extended finite automata model represents a reactive untimed infinite state system and wherein input-state-output behavior of the I/O-EFA preserves input-state-output behavior of the diagram at each sample time.

6. The method of claim 1 wherein the diagram represents multi-rate systems and comprises blocks with sample times having initial offsets and wherein input-state-output behavior of the diagram is obtained by variable-step solvers.

7. The method of claim 1 wherein the diagram comprises mathematically representable automic blocks and rules of combining automic blocks to form complex blocks.

8. The method of claim 1 wherein the input/output-extended finite automata model is defined as a tuple wherein
   L is a set of locations (symbolic-states),
   D=D1 Dn is a set of typed data (numeric-states),
   U=U1 Um is a set of typed numeric-inputs,
   Y=Y1 Yp is a set of typed numeric-outputs,
   is a set of symbolic-inputs,
   Δ is a set of symbolic-outputs,
   is an initial location,
   D0 D is a set of initial-data values,
   is a final location, and
   E is a set of edges, and each e E is a 7-tuple, where
      oe L is an origin location,
      te L is a terminal location,
      is a symbolic-input,
      is a symbolic-output,
      Ge D U is an enabling guard (a predicate),
      is a data-update function, and
      is an output-assignment function.

9. A non-transitory computer-readable storage medium storing computer-executable instructions that are executed on a processing device, the computer-executable instructions comprising:
  instructions for receiving a data representation of a diagram, said diagram comprising a plurality of blocks and said diagram being associated with a graphical modeling environment in which blocks within the diagram define semantics for executing the diagram; and
  instructions for processing the data representation of the diagram to translate the diagram into an input/output-extended finite automata model.

10. The non-transitory computer readable storage medium of claim 9 wherein the instructions for processing the data representation of the diagram to translate the diagram into the input/output-extended finite automata model provide for (a) representing all atomic blocks in said diagram as a triple, (b) representing the diagram using a connecting rule and a conditioning rule, (c) determining an order in which the blocks included inside the diagram are executed, (d) translating the atomic blocks into the I/O-EFA model using a first algorithm, and (e) translating for the connecting rule and the conditioning rule using a second algorithm and a third algorithm, respectively to thereby modify the I/O-EFA model.

11. The non-transitory computer readable storage medium of claim 10 wherein the diagram represents a system with time-dependent continuous behaviors and wherein the input/output-extended finite automata model represents a reactive untimed infinite state system and wherein input-state-output behavior of the I/O-EFA preserves input-state-output behavior of the diagram at each sample time.

12. The non-transitory computer readable storage medium of claim 10 wherein the diagram represents multi-rate systems and comprises blocks with sample times having initial offsets and wherein input-state-output behavior of the diagram is Obtained by variable-step solvers.

13. The non-transitory computer readable storage medium of method of claim 10 wherein the diagram comprises mathematically representable automic blocks and rules of combining automic blocks to form complex blocks.

14. The non-transitory computer readable storage medium of claim 9 wherein the diagram represents a hybrid system combining event-driven discrete and time-dependent continuous behaviors.

15. The non-transitory computer readable storage medium of claim 10 wherein the input/output-extended finite automata model is defined as a tuple wherein L is a set of locations (symbolic-states),
D=D1 Dn is a set of typed data (numeric-states),
U=U1 Um is a set of typed numeric-inputs,
Y=Y1 Yp is a set of typed numeric-outputs,
is a set of symbolic-inputs,
$\Delta$ is a set of symbolic-outputs,
is an initial location,
D0 D is a set of initial-data values,
is a final location, and
E is a set of edges, and each e E is a 7-tuple,
  where
    oe L is an origin location,
    te L is a terminal location,
    is a symbolic-input,
    is a symbolic-output,
    Ge D U is an enabling guard (a predicate),
    is a data-update function, and
    is an output-assignment function.

16. A method of semantic translation of a diagram into input/output-extended finite automata (I/O-EFA) model, the method comprising:
  (i) representing atomic blocks in the diagram as a tuple;
  (ii) representing the diagram using a connecting-rule and a conditioning-rule;
  (iii) determining an order in which the atomic blocks of the diagram are executed;
  (iv) translating the atomic-blocks into an I/O-EFA model;
  (v) translating for the connecting-rule and the conditioning-rule to adjust the I/O-EFA model;
  (vi) storing the I/O-EFA model on a non-transitory computer readable storage medium;
  wherein steps (i) to (v) are performed by a computing device.

17. A system comprising logic performing the method of claim 16 embodied on at least one non transitory computer readable medium.

18. A method of translating a class of diagrams as input/output-extended finite automata, the method comprising:
  receiving a data representation of a diagram at a computing device, said diagram comprising a plurality of blocks and said diagram being associated with a graphical modeling environment which defines semantics for executing the diagram;
  processing using the computing device the data representation of the diagram to translate the diagram into an input/output-extended finite automata model; and
  storing the input/output-extended finite automata model on a non-transitory computer readable storage medium.

* * * * *

UNITED STATES PATENT AND TRADEMARK OFFICE
CERTIFICATE OF CORRECTION

PATENT NO. : 8,655,636 B2
APPLICATION NO. : 13/165907
DATED : February 18, 2014
INVENTOR(S) : Ratnesh Kumar et al.

It is certified that error appears in the above-identified patent and that said Letters Patent is hereby corrected as shown below:

In the Claims:

Col. 18, Claim 8, Line 51:
ADD after tuple -- $P = (L,D,U,Y,\Sigma,\Delta,\ell_0,D_0,\ell_m,E)$ --

Col. 18, Claim 8, Line 53:
DELETE before is "D=D1 Dn"
ADD before is -- $D = D_1 \times ... \times D_n$ --

Col. 18, Claim 8, Line 54:
DELETE before is "U=U1 Um"
ADD before is -- $U = U_1 \times ... \times U_m$ --

Col. 18, Claim 8, Line 55:
DELETE before is "Y=Y1 Yp"
ADD before is -- $Y = Y_1 \times ... \times Y_p$ --

Col. 18, Claim 8, Line 56:
ADD before is -- $\Sigma$ --

Col. 18, Claim 8, Line 58:
ADD before is -- $\ell_0 \in L$ --

Col. 18, Claim 8, Line 59:
DELETE before is "D0 D"
ADD before is -- $D_0 \subseteq D$ --

Signed and Sealed this
Second Day of September, 2014

Michelle K. Lee
*Deputy Director of the United States Patent and Trademark Office*

CERTIFICATE OF CORRECTION (continued)
U.S. Pat. No. 8,655,636 B2

Col. 18, Claim 8, Line 60:
ADD before is -- $\ell_m \in L$ --

Col. 18, Claim 8, Line 61:
DELETE after each "e E"
ADD after each -- $e \in E$ --

Col. 18, Claim 8, Line 62:
ADD before where -- $e = (o_e, t_e, \sigma_e, \delta_e, G_e, f_e, h_e)$, --

Col. 18, Claim 8, Line 63:
DELETE before is "oe L"
ADD before is -- $o_e \in L$ --

Col. 18, Claim 8, Line 64:
DELETE before is "te L"
ADD before is -- $t_e \in L$ --

Col. 18, Claim 8, Line 65:
ADD before is -- $\sigma_k \in \Sigma \cup \{\varepsilon\}$ --

Col. 18, Claim 8, Line 66:
ADD before is -- $\delta_e \in \Delta \cup \{\varepsilon\}$ --

Col. 18, Claim 8, Line 67:
DELETE before is "Ge D U"
ADD before is -- $G_e \subseteq D \times U$ --

Col. 18, Claim 8, Line 68:
ADD before is -- $f_e : D \times U \to D$ --

Col. 18, Claim 8, Line 69:
ADD before is -- $h_e : D \times U \to Y$ --

Col. 19, Claim 10, Line 17:
DELETE after a "triple"
ADD after a -- tuple --

Col. 19, Claim 11, Line 26:
ADD after a -- hybrid --

Col. 19, Claim 15, Line 47:
ADD after tuple -- $P = (L,D,U,Y,\Sigma,\Delta,\ell_0,D_0,\ell_m,E)$ --

Col. 20, Claim 15, Line 2:
DELETE before is "D=D1 Dn"
ADD before is -- $D = D_1 \times ... \times D_n$ --

Col. 20, Claim 15, Line 3:
DELETE before is "U=U1 Um"
ADD before is -- $U = U_1 \times ... \times U_m$ --

Col. 20, Claim 15, Line 4:
DELETE before is "Y=Y1 Yp"
ADD before is -- $Y = Y_1 \times ... \times Y_p$ --

Col. 20, Claim 15, Line 5:
ADD before is -- $\Sigma$ --

Col. 20, Claim 15, Line 7:
ADD before is -- $\ell_0 \in L$ --

Col. 20, Claim 15, Line 8:
DELETE before is "D0 D"
ADD before is -- $D_0 \subseteq D$ --

Col. 20, Claim 15, Line 9:
ADD before is -- $\ell_m \in L$ --

Col. 20, Claim 15, Line 10:
DELETE after each "e E"
ADD after each -- $e \in E$ --

Col. 20, Claim 15, Line 11:
ADD before where -- $e = (o_e, t_e, \sigma_e, \delta_e, G_e, f_e, h_e)$, --

Col. 20, Claim 15, Line 12:
DELETE before is "oe L"
ADD before is -- $o_e \in L$ --

Col. 20, Claim 15, Line 13:
DELETE before is "te L"
ADD before is -- $t_e \in L$ --

CERTIFICATE OF CORRECTION (continued)
U.S. Pat. No. 8,655,636 B2

Col. 20, Claim 15, Line 14:

ADD before is -- $\sigma_e \in \Sigma \cup \{\varepsilon\}$ --

Col. 20, Claim 15, Line 15:

ADD before is -- $\delta_e \in \Delta \cup \{\varepsilon\}$ --

Col. 20, Claim 15, Line 16:
DELETE before is "Ge D U"

ADD before is -- $G_e \subseteq D \times U$ --

Col. 20, Claim 15, Line 17:
ADD before is -- $f_e : D \times U \rightarrow D$ --

Col. 20, Claim 15, Line 18:
ADD before is -- $h_e : D \times U \rightarrow Y$ --